US008296335B2

(12) United States Patent
Bouve et al.

(10) Patent No.: US 8,296,335 B2
(45) Date of Patent: Oct. 23, 2012

(54) METHOD FOR ADVERTISING INFORMATION

(75) Inventors: W. Lincoln Bouve, Milton, MA (US);
William T. Semple, Arlington, VA (US);
Steven W. Oxman, Riva, MD (US)

(73) Assignee: Civix-DDI, LLC, Boulder, CO (US)

(*) Notice: Subject to any disclaimer, the term of this patent is extended or adjusted under 35 U.S.C. 154(b) by 483 days.

(21) Appl. No.: 10/186,537

(22) Filed: Jul. 1, 2002

(65) Prior Publication Data

US 2002/0169541 A1 Nov. 14, 2002

Related U.S. Application Data

(63) Continuation of application No. 09/816,829, filed on Mar. 23, 2001, now Pat. No. 6,415,291, which is a continuation of application No. 08/920,044, filed on Aug. 28, 1997, now Pat. No. 6,408,307, which is a continuation of application No. 08/371,425, filed on Jan. 11, 1995, now Pat. No. 5,682,525.

(51) Int. Cl.
*G06F 17/30* (2006.01)

(52) U.S. Cl. ........ 707/806; 707/804; 707/825; 705/14.4

(58) Field of Classification Search ............. 707/10, 707/104.1, 3, 200, 201, 102, 804, 806, 825; 705/14, 14.4; 701/200, 201
See application file for complete search history.

(56) References Cited

U.S. PATENT DOCUMENTS

| | | | | |
|---|---|---|---|---|
| 3,614,328 A | * | 10/1971 | McNaughton et al. | ........ 370/270 |
| 4,645,873 A | * | 2/1987 | Chomet | ............ 379/93.12 |
| 4,757,267 A | | 7/1988 | Riskin | |
| 4,761,742 A | | 8/1988 | Hanabusa | |
| 4,870,576 A | | 9/1989 | Tornetta | |
| 4,951,212 A | | 8/1990 | Kurihara | |
| 4,974,170 A | * | 11/1990 | Bouve et al. | ............ 715/855 |
| 5,032,989 A | * | 7/1991 | Tornetta | .............. 705/1 |
| 5,155,689 A | | 10/1992 | Wortham | |
| 5,164,904 A | | 11/1992 | Sumner | |

(Continued)

FOREIGN PATENT DOCUMENTS

EP 508 787 10/1992

(Continued)

OTHER PUBLICATIONS

Reexamination Control No. 90/008,398, Examiner Interview Summary, Dec. 19, 2008, 10 pages.

(Continued)

*Primary Examiner* — Shahid Alam
(74) *Attorney, Agent, or Firm* — Lathrop & Gage LLP

(57) ABSTRACT

Methods for advertising information include: displaying user-selectable category and geographic vicinity information at a port; and, at a database that is not at the same location as the port; responding to user input at the port to display, at the port, advertising information that is associated with a user-selected category and geographic vicinity. Methods for updating advertising information in a database include: storing advertising information about a plurality of places in the database; updating the advertising information from a first port connected to the database through the Internet; and responding, at the database, to user inputs at a second port connected to the database through the Internet, to display updated advertising information at the second port. Advertisements can be tagged to items of interest and displayed.

25 Claims, 15 Drawing Sheets

U.S. PATENT DOCUMENTS

| | | | |
|---|---|---|---|
| 5,197,009 A * | 3/1993 | Hoffman et al. | 701/200 |
| 5,200,993 A | 4/1993 | Wheeler et al. | |
| 5,214,757 A | 5/1993 | Mauney et al. | |
| 5,220,501 A | 6/1993 | Lawlor et al. | |
| 5,229,988 A | 7/1993 | Marbaker et al. | |
| 5,237,693 A | 8/1993 | Kiyohara et al. | |
| 5,241,625 A | 8/1993 | Epard et al. | |
| 5,251,205 A | 10/1993 | Callon et al. | |
| 5,253,342 A | 10/1993 | Blount et al. | |
| 5,261,044 A | 11/1993 | Dev et al. | |
| 5,276,789 A | 1/1994 | Besaw et al. | |
| 5,282,270 A | 1/1994 | Oppenheimer et al. | |
| 5,287,103 A | 2/1994 | Kasprzyk et al. | |
| 5,289,572 A * | 2/1994 | Yano et al. | 715/855 |
| 5,291,413 A * | 3/1994 | Tamai et al. | 701/210 |
| 5,293,163 A | 3/1994 | Kakihara et al. | |
| 5,293,635 A | 3/1994 | Faulk, Jr. et al. | |
| 5,309,437 A | 5/1994 | Perlman et al. | |
| 5,351,146 A | 9/1994 | Chan et al. | |
| 5,351,237 A | 9/1994 | Sinohara et al. | |
| 5,355,365 A | 10/1994 | Bhat et al. | |
| 5,375,068 A | 12/1994 | Palmer et al. | |
| 5,424,951 A | 6/1995 | Nobe et al. | |
| 5,485,161 A * | 1/1996 | Vaughn | 342/357.13 |
| 5,530,703 A | 6/1996 | Liu et al. | |
| 5,530,852 A | 6/1996 | Meske et al. | |
| 5,533,026 A | 7/1996 | Ahmadi et al. | |
| 5,534,438 A | 7/1996 | Hayden et al. | |
| 5,535,199 A | 7/1996 | Amri et al. | |
| 5,537,141 A | 7/1996 | Harper et al. | |
| 5,537,586 A | 7/1996 | Amram et al. | |
| 5,539,736 A | 7/1996 | Johnson et al. | |
| 5,543,789 A * | 8/1996 | Behr et al. | 340/995.12 |
| 5,544,315 A | 8/1996 | Lehfeldt | |
| 5,544,317 A | 8/1996 | Berg | |
| 5,544,320 A | 8/1996 | Konrad | |
| 5,546,324 A | 8/1996 | Palmer et al. | |
| 5,548,729 A | 8/1996 | Akiyoshi et al. | |
| 5,579,535 A * | 11/1996 | Orlen et al. | 455/421 |
| 5,584,025 A * | 12/1996 | Keithley et al. | 707/104.1 |
| 5,596,500 A | 1/1997 | Sprague | |
| 5,608,635 A | 3/1997 | Tamai | |
| 5,625,668 A | 4/1997 | Loomis | |
| 5,682,525 A * | 10/1997 | Bouve et al. | 707/104.1 |
| 5,692,525 A * | 12/1997 | Counts et al. | 131/194 |
| 5,732,074 A | 3/1998 | Spaur | |
| 5,930,474 A | 7/1999 | Dunworth | |
| 5,956,509 A | 9/1999 | Kevner | |
| 6,006,160 A | 12/1999 | Tamaki | |
| 6,049,711 A | 4/2000 | Ben-Yehezkel | |
| 6,282,489 B1 * | 8/2001 | Bellesfield et al. | 701/201 |
| 6,374,177 B1 * | 4/2002 | Lee et al. | 701/200 |
| 2002/0046084 A1 * | 4/2002 | Steele et al. | 705/14 |

FOREIGN PATENT DOCUMENTS

| | | |
|---|---|---|
| EP | 508 787 | 3/1996 |
| JP | 61-12119 | 6/1986 |
| JP | 61-194473 | 8/1986 |
| JP | 61-194475 | 8/1986 |
| JP | 1-284889 | 11/1989 |
| WO | WO 97/07467 | 2/1997 |
| WO | WO 97/15889 | 5/1997 |

OTHER PUBLICATIONS

Reexamination Control No. 90/008,192, Response filed May 8, 2009, 16 pages.
Reexamination Control No. 90/008,192, Advisory Action, mailed May 5, 2009, 6 pages.
Reexamination Control No. 90/008,192, Examiner Interview Summary, mailed Apr. 30, 2009, 5 pages.
Reexamination Control No. 90/008,192, Declaration of William Semple (37 CFR § 1.131), filed Apr. 22, 2009, 16 pages.
Reexamination Control No. 90/008,192, Exhibits 1-15 of 37 CFR § 1.131 Affidavit, originally submitted Jan. 29, 2009, electronically filed Apr. 17, 2009, 88 pages.
Reexamination Control No. 90/008,192, Advisory Action, mailed Apr. 14, 2009, 13 pages.
Reexamination Control No. 90/008,192, Patent Owner's Summary of Apr. 10, 2009 Telephone Interview, filed Apr. 10, 2009, 3 pages.
Reexamination Control No. 90/008,192, Advisory Action, mailed Apr. 3, 2009, 11 pages.
Reexamination Control No. 90/008,192, Decision Dismissing Petition, Mar. 25, 2009, 5 pages.
Reexamination Control No. 90/008,192 Petition Under 37 CFR § 1.183, Jan. 21, 2009, 9 pages.
Reexamination Control No. 90/008,192 Transmittal Letter for and Corrected Petition (37 CFR § 1.183) filed Jan. 30, 2009, 10 pages.
Court Papers from Civil Action No. 99-B-172 (D), Defendant ZIP2 Declaration of David Bloch.
Court papers from Civil Action No. 99-B-1-72 (D), Exhibit B, Defendant's Claim Comparison to Mapinfo & Mapbase.
Court Papers from Civil Action No. 99-B-172 (D), Defendant Invalidity Allegation to Pioneer and Nippondenso Vehicle Navigation Systems.
Court Papers from Civil Action No. 99-B-172 (D), Defendant Claim Comparison Allegation to US4951212, US4761742 and Mitsubishi CU9300.
Court Papers from Civil-Action No. 99-B-172 (D), Defendant ZIP2 Corporation Allegations.
Court Papers from Civil Action No. 99-B-172 (D), Defendant Excite Allegations.
Court Papers from Civil Action No. 99-B-172 (D), Defendant ZIP2 Corporation Summary Judgment Motion.
Court Papers from Civil Action No. 99-B-172 (D), Defendant Microsoft Memorandum.
Court Papers from Civil Action No. 03 C 3792 (N.D. III), Defendant Motorola's Answer, Defenses and CounterClaims.
Court Papers from Civil Action No. 03 C 3792 (N.D. III), Defendant Expedia and Travelscape's Answer, Defenses and CounterClaims.
Court Papers from Civil Action No. 03 C 3792 (N.D. III), Defendant Cellco Partnership's Answer, Defenses and CounterClaims.
Preliminary Amendment, Related U.S. Appl. No. 09/816,829, Mar. 23, 2001.
Office Action, Related U.S. Appl. No. 09/816,829, Aug. 23, 2001.
Response to Office Action, Related U.S. Appl. No. 09/816,829, Jan. 8, 2002.
Notice of Allowability, Related U.S. Appl. No. 09/816,829, Mar. 18, 2002.
Preliminary Amendment, Related U.S. Appl. No. 08/920,044, Aug. 28, 1997.
Preliminary Amendment, Related U.S. Appl. No. 08/920,044, Sep. 26, 1997.
Office Action, Related U.S. Appl. No. 08/920,044, Feb. 20, 2001.
Response to Office Action, Related U.S. Appl. No. 08/920,044, Jul. 3, 2001.
Office Action, Related U.S. Appl. No. 08/920,044, Aug. 21, 2001.
Draft Response to Office Action, Related U.S. Appl. No. 08/920,044, Oct. 3, 2001.
Continued Prosecution Application, Related U.S. Appl. No. 08/920,044, Nov. 21, 2001.
Response and Preliminary Amendment, Related U.S. Appl. No. 08/920,044, Nov. 21, 2001.
Interview Summary, Related U.S. Appl. No. 08/920,044, Dec. 14, 2001.
Notice of Allowability, Related U.S. Appl. No. 08/920,044, Dec. 17, 2001.
Formal Drawings, Related U.S. Appl. No. 08/920,044, Feb. 25, 2002.
Declaration of Robert Norton [REDACTED], Dec. 13, 2006, Civil Action No. 05 C 6869.
"Starting today, the way you find a home will never be the same," HomeView, Inc. screen shots, Nov. 13, 1991, Exhibit 1 to the Declaration of Robert Norton.
"HomeView™ Executive Summary," 1991, PicNet International, Inc., Exhibit 3 to the Declaration of Robert Norton.
"Homevew™ The Best Way to Buy Your Next Home," Custom Catalog printed for John and Mary Doe, Sep. 24, 1990, pp. 1-29, HomeView, Natick, MA, Exhibit 11 to the Declaration of Robert Norton.

. "List your home with a HomeView REALTOR® and start packing," 1992, HomeView, Inc., Exhibit 12 to the Declaration of Robert Norton.

"Finally, there's a better way to buy a home", 1992, HomeView, Inc., Exhibit 12 to the Declaration of Robert Norton, Exhibit 12 to the Declaration of Robert Norton.

"Finally, brokers get a break," HomeView™ Realty Search Centers brochure, 1991, HomeView, Inc., Exhibit 12 to the Declaration of Robert Norton.

"That was then. This is now." HomeView™ flyer, 1992, HomeView, Inc., Exhibit 12 to the Declaration of Robert Norton.

"Starting today, the way you find a home will never be the same." HomeView™ brochure, circa 1993, HomeView, Inc., Exhibit 12 to the Declaration of Robert Norton.

"A View With a Room," Entrepreneur, Mar. 1992, Exhibit 13 to the Declaration of Robert Norton.

"Home buyers shop using multimedia," USA Today, Oct. 2, 1992, Exhibit 13 to the Declaration of Robert Norton.

"High-Tech Home Buying," Newsweek, p. 5, Jun. 1, 1992, Exhibit 13 to the Declaration of Robert Norton.

Cove, Lynda, "A new meaning to home delivery," The Boston Herald, Real Estate Pullout Section, Jan. 10, 1992, Exhibit 13 to the Declaration of Robert Norton.

"Century 21 Dwyer & Stilton is Member Broker with Home View," Hanover South Shore News, Sep. 28, 1992, Exhibit 13 to the Declaration of Robert Norton.

Thurmond, Rick, "High-tech Home Sales," Sun Chronicle, Exhibit 13 to the Declaration of Robert Norton.

"What's New," Popular Science, p. 16, May 1992, Exhibit 13 to the Declaration of Robert Norton.

"Homeview announces equity investment by IBM," HomeView™ Realty Search Services press release, Sep. 16, 1992, Exhibit 13 to the Declaration of Robert Norton.

Brickman, Sue, "House hunting," Real Estate Update, Jan. 17, 1992, Exhibit 13 to the Declaration of Robert Norton.

Ravo, Nick, "House-Hunting by Interactive Computer," The New York Times Real Estate Section, Exhibit 13 to the Declaration of Robert Norton.

"Home-Shopping Networks," Inc., p. 53, Mar. 1993, Exhibit 13 to the Declaration of Robert Norton.

Labanca, Lisa, "IBM backing HomeView," Middlesex News, Sep. 17, 1992, Exhibit 13 to the Declaration of Robert Norton.

Rosenberg, Ronald and Ackerman, Jerry, "IBM Moves Into HomeView," The Boston Globe, Sep. 16, 1992, Exhibit 13 to the Declaration of Robert Norton.

"Joyce Cook Realtors adopts HomeView," Salem Evening News, Business Highlights, Sep. 18, 1992, Exhibit 13 to the Declaration of Robert Norton.

"Virtual Real Estate," Lear's, May 1992, Exhibit 13 to the Declaration of Robert Norton.

Barrett, Bob, "Home buyers: Let your fingers do the walking," The Patriot Ledger, Dec. 20, 1991, Exhibit 13 to the Declaration of Robert Norton.

"Looking for a House on a Computer Screen," The Wall Street Journal Marketplace, Mar. 23, 1992, Exhibit 13 to the Declaration of Robert Norton.

"Marblehead Proprerties [sic.] part of computer database," Swampscott Reporter, Sep. 3, 1992, Exhibit 13 to the Declaration of Robert Norton.

Bianchi, Alessandra, "Home-Shopping Networks," New Businesses, Inc., p. 53, Mar. 1993, Exhibit 13 to the Declaration of Robert Norton.

"Home Finder," Popular Science, vol. 240, No. 5, May 1992, Exhibit 13 to the Declaration of Robert Norton.

"Realtor joins digital sales service," Haverhill Gazette, Sep. 9, 1992, Exhibit 13 to the Declaration of Robert Norton.

Goerne, Carrie, "Service eases house-hunting hassles," Marketing News™, Exhibit 13 to the Declaration of Robert Norton.

Eng, Paul M., Ed., "Three Bedrooms, River View? I'll Punch That Right Up," Business Week, Jan. 20, 1992, Exhibit 13 to the Declaration of Robert Norton.

"The Home-Shopping Network,": CIO The Magazine for Information Executives, Mar. 1992, Exhibit 13 to the Declaration of Robert Norton.

Phelps, Dan, "A unique way to search for a home," Needham Times, vol. 25, No. 4, Jan. 16, 1992, Exhibit 13 to the Declaration of Robert Norton.

Ricker Maynard, Joanne, "HomeView: User-friendly house hunting," Exhibit 13 to the Declaration of Robert Norton.

"Front-runners: The Victor Company, Inc. Realtor offices are now HomeView member brokers," The Eagle-Tribune, Sep. 25, 1992, Exhibit 13 to the Declaration of Robert Norton.

Ackerman, Jerry, "ZAP! Real estate shopping meets the computer age," The Boston Sunday Globe, Nov. 22, 1992, Exhibit 13 to the Declaration of Robert Norton.

Related U.S. Appl. No. 08/371,425, Office Action dated Oct. 2, 1996.

Related U.S. Appl. No. 08/371,425, Response to Office Action dated Oct. 2, 1996.

U.S. Appl. No. 90/008,398, Request for Ex Parte Reexamination, Dec. 22, 2006, 95 pages.

U.S. Appl. No. 90/008,398, Office Action mailed Mar. 3, 2008, 19 pages.

U.S. Appl. No. 90/008,398, Ex Parte Reexamination Interview Summary mailed May 2, 2008, 7 pages.

U.S. Appl. No. 90/008,398, Statement of Substance of Interview and Response to Office Action of Mar. 3, 2008, filed May 28, 2008, 42 pages.

U.S. Appl. No. 90/008,398, Office Action mailed Oct. 24, 2008, 40 pages.

U.S. Appl. No. 90/008,329, Request for Ex Parte Reexamination, Jan. 23, 2007, 99 pages.

U.S. Appl. No. 90/008,329, Office Action mailed Mar. 3, 2008, 28 pages.

U.S. Appl. No. 90/008,329, Ex Parte Reexamination Interview Summary mailed May 2, 2008, 7 pages.

U.S. Appl. No. 90/008,329, Statement of Substance of Interview and Response to Office Action of Mar. 3, 2008, filed May 28, 2008, 58 pages.

U.S. Appl. No. 90/008,329, Office Action mailed Sep. 30, 2008, 58 pages.

U.S. Appl. No. 90/008,192, Request for Ex Parte Reexamination, Sep. 20, 2006, 172 pages.

U.S. Appl. No. 90/008,192, Office Action mailed Mar. 28, 2008, 57 pages.

U.S. Appl. No. 90/008,192, Ex Parte Reexamination Interview Summary mailed May 2, 2008, 7 pages.

U.S. Appl. No. 90/008,192, Statement of Substance of Interview and Response to Office Action of Mar. 28, 2008, filed May 28, 2008, 64 pages.

U.S. Appl. No. 90/008,192, Office Action mailed Nov. 19, 2008, 79 pages.

Reexamination Control No. 90/008,192 Response to Office Action filed Jan. 21, 2009, 50 pages.

Reexamination Control No. 90/008,192 Patent Owner's Summary of Dec. 9, 2008 Examiner's Interview, filed Jan. 12, 2009, 3 pages.

Reexamination Control No. 90/008,192 Examiner's Interview Summary, Dec. 9, 2008, 10 pages.

Braun, Eric, Chapter 5, The Internet Directory, first edition dated Jan. 1994, pp. 355-397.

Braun, Eric, Chapter 4, The Internet Directory, first edition dated Jan. 1994, pp. 352-354.

Braun, Eric, Chapter 9, The Internet Directory, first edition dated Jan. 1994, pp. 522-561.

Braun, Eric, Chapter 10, The Internet Directory, first edition dated Jan. 1994, pp. 562-565.

Braun, Eric, Chapter 13, The Internet Directory, first edition dated Jan. 1994, pp. 610-615.

Braun, Eric, Chapter 14, The Internet Directory, first edition dated Jan. 1994, pp. 562-617.

Braun, Eric, Chapter 6, The Internet Directory, first edition dated Jan. 1994, pp. 398-479.

Braun, Eric, Index, The Internet Directory, first edition dated Jan. 1994, pp. 547-704.

Braun, Eric, Chapter 12, The Internet Directory, first edition dated Jan. 1994, pp. 571-609.

Braun, Eric, Chapter 3, The Internet Directory, first edition dated Jan. 1994, pp. 277-351.

Braun, Eric, Chapter 1, The Internet Directory, first edition dated Jan. 1994, pp. 3-100.
Braun, Eric, Chapter 11, The Internet Directory, first edition dated Jan. 1994, pp. 566-570.
Braun, Eric, Chapter 15, The Internet Directory, first edition dated Jan. 1994, pp. 618-646.
Braun, Eric, Table of Contents and Introduction, The Internet Directory, first edition dated Jan. 1994, pp. i-xxii.
Braun, Eric, Chapter 2, The Internet Directory, first edition dated Jan. 1994, pp. 201-276.
Braun, Eric, Chapter 7, The Internet Directory, first edition dated Jan. 1994, pp. 480-519.
Braun, Eric, Chapter 8, The Internet Directory, first edition dated Jan. 1994, pp. 520-521.
Braun, Eric, Mailing Lists, The Internet Directory, first edition dated Jan. 1994, pp. 101-200.
Reexamination Control No. 90/008,329, Ex Parte Reexam Advisory Action mailed May 21, 2009, 6 pages.
Reexamination Control No. 90/008,192, Ex Parte Reexam Advisory Action mailed May 21, 2009, 7 pages.
Reexamination Control No. 90/008,329, Supplemental Declaration of William Semple (37 CFR § 1.131), filed May 8, 2009, 109 pages.
Reexamination Control No. 90/008,329, Advisory Action, May 5, 2009, 5 pages.
Reexamination Control No. 90/008,329, Examiner Interview Summary, Apr. 30, 2009, 4 pages.
Reexamination Control No. 90/008,329, Transmittal Letter and Corrected Claim Chart filed Apr. 30, 2009, 9 pages.
Reexamination Control No. 90/008,329, Declaration of William Semple (37 CFR § 1.131), filed Apr. 22, 2009, 15 pages.
Reexamination Control No. 90/008,329, Decision Granting Petition Under 37 CFR §1.137(b), Apr. 16, 2009, 6 pages.
Reexamination Control No. 90/008,329, Advisory Action Apr. 14, 2009, 19 pages.
Reexamination Control No. 90/008,329, Advisory Action, Apr. 6, 2009, 16 pages.
Reexamination Control No. 90/008,329, Decision Dismissing Petition, Mar. 25, 2009, 7 pages.
Reexamination Control No. 90/008,329, Petition Under 37 CFR § 1.183, Jan. 21, 2009, 9 pages.
Reexamination Control No. 90/008,329, Response to Office Action filed Jan. 21, 2009, 48 pages.
Reexamination Control No. 90/008,329, Patent Owner's Summary of Dec. 9, 2008 filed Jan. 12, 2009, 4 pages.
Reexamination Control No. 90/008,329, Examiner Interview Summary, Dec. 9, 2008, 10 pages.
Reexamination Control No. 90/008,398, Advisory Action, May 5, 2009, 4 pages.
Reexamination Control No. 90/008,398, Transmittal Letter, Corrected Claim Chart and Applicant Interview Summary filed Apr. 30, 2009, 6 pages.
Reexamination Control No. 90/008,398, Examiner Interview Summary dated Apr. 30, 2009, 4 pages.
Reexamination Control No. 90/008,398, Notice of Appeal filed Apr. 24, 2009, 1 page.
Reexamination Control No. 90/008,398, Transmittal Letter for Corrected Petition and 37 CFR §1.131 Declarations filed Apr. 22, 2009, 18 pages.
Reexamination Control No. 90/008,398, Advisory Action mailed Apr. 13, 2009, 17 pages.
Reexamination Control No. 90/008,398, Decision Dismissing Petition, Mar. 25, 2009, 8 pages.
Reexamination Control No. 90/008,398, Response to Office Action filed Jan. 21, 2009, 57 pages.
Reexamination Control No. 90/008,398, Petition Under 37 CFR § 1.183, Jan. 21, 2009, 9 pages.
Reexamination Control No. 90/008,398, Decision Granting Petition Under 37 CFR §1.1550(c), Dec. 23, 2008, 5 pages.
Reexamination Control No. 90/008,398, Patent Owner's Request for Extension of Time (37 CFR §1.550(c), Dec. 18, 2008, 4 pages.
Reexamination Control No. 90/008,398, Patent Owner's Summary of Dec. 9, 2008 Examiner's Interview filed Jan. 12, 2009, 3 pages.
Maguire, David J., et al. "Geographical Information System," Longman Scientific & Technical. (1991), v1 at 9-18, 55-65, 119-161, 238-267, 319-360, 375, and 457-474, and v2 at 115-134, 247-260, 297-301, Plates 56.11 and 56.12.
U.S. Patent No. 5,543,789 (Behr, et al).
U.S. Patent No. 6,385,622 B2 (Bouve, et al.).
U.S. Patent No. 6,473,692 B2 (Hancock, et al.).
Brochure "The Official Recreation Guide," Applied Information Services, (1988), all pages.
Smith, Bart, "Computer Trekking," The Whitefish Pilot, (Mar. 23, 1988), all pages.
Hopkins, Roger, "Whitefish at hub of tourism world" The Daly Inter Lake, (Apr. 3, 1998), all pages.
Schwennsen, Dan, "The World According to Jeff," Missoulnian, (Nov. 11, 1990), all pages.
Stone, John, "AIS and Sabre to Distribute Official Recreation Guide," Tour & Travel News, Issue No. 126 (Apr. 24, 1989) all pages.
Johnston, Stuart J., "CD Rom Can Help in Data Overload," InfoWorld Media Group, (Jul. 17, 1989), all pages.
"Official Recreation Guide Available on Eaasy Sabre," Aviation Daily, vol. 301, No. 5, (Jul. 9, 1990), all pages.
Davis, Dean, "Big Sky Information Explosion," FedGazette, (Jul. 1991), all pages.
Roberti, Mark, "High Anxiety on Info Highway," Tour & Travel News, (Feb. 28, 1994), all pages.
Manuelli, Joe, NTA Schedules January Debut for Its Private Online System, Travel Weekly, vol. 53, No. 88, (Nov. 7, 1994), all pages.
Onofri, Adrienne, "Perfect Timing," Travel Agent, (Mar. 13, 1995), all pages.
Juliano, Suzanne Smith, "Caribbean Isles Find a Home on Internet's Worldwide Web," Tour & Travel News, (Jun. 5, 1995), all pages.
Reed Travel Croup, "NTA Sets Data for Electronic Booking Option," Travel Weekly, vol. 54, No. 48, (Jun. 19, 1995), all pages.
Caribbean Tourism Organization, "CTO reaches out to agents, consumers viat World Wide Web", Travel Weekly, vol. 54, No. 65 (Aug. 17, 1995).
"PC Autoroute Upgraded," Computer Shopper, No. 15, (May 1989), all pages.
"Nextbase—Autoroute Pluse Network," Computers in Distribution News, Newsletter No. 12, (Nov. 1989), all pages.
McFarlane, John, "Software Review Autoroute Plus," Software Review, (Dec. 1989), all pages.
Bartram, Peter, "Nextbase Knows Where its Going," Business Winner, (Autumn 1990), all pages.
"Nextbate Shows the Way Home" Practical PC, (Nov. 1992), all pages.
"Autoroute v. Milemaster: Taking a Test Drive," PC Today, (Jul. 1993), all pages.
Davis, Malory, "On the Right Route," Transport, May-Jun. 1993), all pages.
Park, Clayton, "Automap Finds Bumpy Road to Success," Puget Sound Business Journal, (Oct. 7, 1993), all pages.
"Software Helps You Get From Point A to B," Windows (NY), (Jan. 1994), all pages.
Schuon, Marshall, "Automap Can Get You There," Spokane Spokesman-Review, (Feb. 5, 1994), all pages.
Davison, Tyler, "Automap Drives Agents Dorm Information Highway," Travelage West (CA), (Mar. 28, 1994), all pages.
Hall, Larry, "Automap Road Atlas Programs Aids Highway Travel Planning" Kent, WA Vally Daily News, (Apr. 22, 1994), all pages.
Leron, Yael, "Mapping Programs Turn PC Into Navigator," Walnut Creek, CA Contra Costa Times, (Jun. 8, 1994), all pages.
Merin, Jennifer, "Scrolling the World with PC Software, Online Services," Globe, Dodge City, KS (Sep. 9, 1994), all pages.
Shuon, Marshall, "Where's New York," The New York Times, Section 8, (Feb. 23, 1992), all pages.
Rahman, Melissa. Press Release "Automap Announces Upgraded Road Atlas," Automap Road Atlas, Jul. 30, 1993), all pages.
White, Vicci, Press Release Automap Announces CD-Rom Version of Popular Automap Road Atlas, Automap, Inc. (Mar. 7, 1994), all pages.
Gordon, Martin, "Getting Down to Business," Mapping Awareness & GIS in Europe, vol. 7, No. 3, (Apr. 1993), all pages.

Mapbase User Manual, Nextbase Limited, (1992-1993), all pages.
Zutell, Irene and Ballinger, Steve, "Hotel Presence on Internet Grows as Choice, Holiday Inn Set Up Cybershop," Travel Agent, (Jun. 12, 1995), all pages.
Diamond, Kerry, "First to the Net: Hotel Companies Have Been Pioneers in Getting Information About Their Properties," Travel Agent, (Apr. 10, 1995), all pages.
Seal, Kathy, "Consumers Browse Through Hotels on Computer Network," Hotel & Motel Management, vol. 210, No. 2, (Feb. 6, 1995), all pages.
Golden, Fran, "Thisco Gets 'Amazing' Response to Hotel Internet Database," Travel Weekly, vol. 53, No. 88, (Nov. 7, 1994), all pages.
Richards, Rhonda, et al. "Internet Brings Hotel Rooms to Travelers," USA Today, (Nov. 1, 1994), all pages.
Finlay, Douglas, "Wary Agents Say Thisco's Hotel System on Internet May Hold Promise for Trade," Travel Agent, (Oct. 24, 1994), all pages.
Golden, Fran, "Program Lets Internet Users Book Hotels," Travel Weekly, vol. 53, No. 81, (Oct. 13, 1994), all pages.
O'Brien, Gina, "A Welcoming Relationship Hotels Strengthen Ties With Agents as Bookings Become Easier Through Computerized Reservation Systems," Travel Agent, (Dec. 26, 1994), all pages.
Finlay, Douglas. "Power to the PC People New PC Applications Help Travel Agents Manage Data & H andle Bookings More Efficiently," Travel Agent, (Dec. 26, 1994), all pages.
Lewis, Peter H., "At Your Fingertips Exploring the Back Alleys and Remote Corners of Cyberspace," Chicago Tribune, Chicago Tribune, (Dec. 18, 1994), all pages.
Lewis, Peter H., "Traveling the Information Highway," New York Times, (Dec. 17, 1994), all pages.
"Giants Members Get the Message About Adjusting to Technology," Travel Agent, (Nov. 21, 1994), all pages.
Cohen, Amon, "Media Futures: Book Me Out of Nerdland," Financial Times, (Aug. 7, 1995), all pages.
"Southwest Airlines Offers Link to Hotel Information Through Internet Home Page," PR Newswire, (Jun. 16, 1995), all pages.
Wilder, Clinton, The Internet Pioneers—The Emergence of the World Wide Web and Mosaic has Convinced Early Corporate Adopters of the Viability of Doing Business Online:, Information Week, (Jan. 9, 1995), all pages.
"Hotel Industry Links to Internet and Hyatt Signs On," Business Wire, (Oct. 11, 1994), all pages.
"Pathways to Productivity & Profitability," Tour & Travel News, (Nov. 14, 1994), all pages.
Maddox, Kate, "Holiday Inn's 'Virtual Tours'," Business and Industry, (Jun. 19, 1995), all pages.
Vis, David, 'Best Western is Latest Hotel Chain to Market Properties on Internet, Travel Weekly, vol. 54, No. 8, (Jan. 30, 1995), all pages.
"Applications Line: 6,500 Sabrevision Systems Sold to Date," Multimedia & Videodisc Monitor Future Systems, Inc., vol. 9, No. 12, (Dec. 1, 1991), all pages.
"Infobits," IDP Report Simba Information, Inc., vol. 12, No. 33, (Dec. 6, 1991), all pages.
Borzo, Jeanette. "Sabre Video Res System to be Ready in October." Business Travel News, Issue 167, (Mar. 5, 1990), all pages.
Godwin, Nadine, "Sabrevision Prepares for October Debut," Travel Weekly, (Feb. 26, 1990), all pages.
Stone. John, "Hyatt Announces Ad Contract with Jaguar-Sabrevision," Tour & Travel News, Issue 185, (Jun. 18, 1990), all pages.
Fairlie, Rik, "Major Agencies OK Installation of Sabrevision," Travel Weekly, (Jun. 18, 1990), all pages.
Fairlie, Rik, "Sabrevision Officially Goes Online," Travel Weekly, (Oct. 1, 1990), all pages.
"Online, ICC, Reed Travel Group Team Up to Produce Jaguar on Sabrevision Hotel Directory," PR Newswire, (Jan. 28, 1991), all pages.
Fairlie, Rik, "World Iris Available on Datas II," Travel Weekly, (Feb. 28, 1991), all pages.
"News & Analysis New CD-Rom Support is Coming to Netware Servers," LAN Times, vol. 16, p. 15 (Apr. 1, 1991), all pages.
Polilli, Steve, "AA Boasts of New Systems," Software Magazine, vol. 11, No. 6 (May 1, 1991), all pages.

Blum, Ernest, "Jaguar to Make Cruise Directory Available to Agents in December," Travel Weekly, (Jul. 1, 1991), all pages.
Stone, John, "Covia Spotlights Electronic Maps in Video System," Tour & Travel News, Issue 244, (Sep. 9, 1991), all pages.
"Survey Assesses Agents' Use of Jaguar Hotel System," Travel Weekly, (Oct. 7, 1991), all pages.
"Sabre 25 Percent Above Sabrevision Sales Plan," Aviation Daily, vol. 308, No. 8, (Oct. 10, 1991), all pages.
Campbell, Cynthia V., "BR Travel Agencies are Keeping Ahead of Computer Game," (Dec. 15, 1991), all pages.
Fairlie, Rik, "Polishing Hotel On-Screen Image," Travel Weekly, (Jun. 22, 1993), all pages.
Godwin, Nadine, "AAL in Pact to Develop Sabrevision," Travel Weekly, (Jul. 31, 1989), all pages.
Jaguar Magazine, vol. 1, No. 1, (1990-91), all pages.
Jaguar Magazine, vol. 2, No. 1, (1990-91), all pages.
Jaguar Magazine, vol. 2, No. 2, (1990-91), all pages.
Jaguar Magazine, vol. 2, No. 3, (1990-91), all pages.
Jaguar, Press Release "ITT/Sheraton Corp. Finalizes Deal with Reed Travel Group to Put Hotels on Jaguar Directory," (Feb. 22, 1991), all pages.
Jaguar, Press Release. "Jaguar Begins Ad Sales for Its Third Edition with Enthusiastic Support From the Hotel Industry," (Nov. 9, 1990), all pages.
Jaguar, "Highlight of 1991 Jaguar Usage Study," (1991), all pages.
Jaguar/Sabrevision Brochure "The Way Travel agents Select Hotels is About to Change," Reed Travel Group, (1990), all pages.
Jaguar/Sabrevision Ad "The Market Thinks It's the Cat's Meow," Reed Travel Group, (1991), all pages.
Jaguar Brochure "You Have a Choice," Reed Travel Group, (1990-91), all pages.
Jaguar/Sabrevision Brochure "Now Appearing in Jaguar on Sabrevision," (1990-91), all pages.
Jaguar Brochure "We're Hearing Great Things," (1991), all pages.
Jaguar/Sabrevision Brochure "Pop Up at the Point-of-Sale," (1990-91), all pages.
Bowen, Charles, "CompuServe from A to Z," Random House, Inc., Second Edition (1994), all pages.
"CompuServe Almanac an Offline Reference of Online Services," CompuServe, Inc., Fourth Edition, (1988), all pages.
Bowen, Charles and Peyton, David, "How to Get the Most Out of CompuServe," Random House, Fifth Edition, (1993), all pages.
Ellsworth, Jill, H. and Ellsworth, Matthew V., "Using CompuServe," Que Corporation, (1994), all pages.
"Eaasy Sabre Reference Guide," (1991), all pages.
"Eaasy Sabre User's Guide," (1988), all pages.
"CompuServe Information Service User's Guide," CompuServe Inc., (1988), all pages.
CompuServe Magazine, (Dec. 1993), all pages.
CompuServe Magazine, (Jun. 1993), all pages.
CompuServe Magazine, (May 1993), all pages.
Online Today the Computer Communications Magazine, (Jan. 1985), all pages.
Online Today. (Mar. 1988), pp. 48-51.
Email from Scott Lofteness to David Eastburn regarding Internet Forum, (Nov. 8, 2003), all pages.
"PARS-HMI System High-Level Design Document Version 3.0," (Aug. 28, 1989), all pages.
Chris Shipley, "How to Connect," Ziff-Davis Press, (1993), all pages.
Ogden, Jeff, "CompuServe Extends Information Superhighway with Enhanced Internet Access," (Apr. 5, 1994), all pages.
Steiner, Gary, "CompuServe Extends Information Superhighway with Enhanced Internet Access," (Mar. 11, 1994), all pages.
Wheeler, Berry, "CompuServe Access," (Mar. 11, 1994), all pages.
Jackson, Ed, "CompuServe Subscribers to Have R.C.S. Access," (Mar. 13, 1994), all pages.
Hahn, Andrew, "Telnet to CompuServe," (Apr. 1, 1994), all pages.
McCandish, Stanton, "CIS Via Telnet—Finally," (Apr. 5, 1994), all pages.
Jensen, Mark E., "CIS Info.," (May 17, 1994), all pages.
Gaynor, Jim, "CompuServe Via Telnet," (Jun. 25, 1994), all pages.
Trump, Jason, "Telnet to CompuServe," (Jul. 13, 1992), all pages.

Black, David, "This is How to Telnet to CompuServe," (Oct. 19, 1992), all pages.
Vermaak, Jan, "Again Please: Telnet to CompuServe," (Feb. 13, 1993), all pages.
Roers, Keith, "eAAsy Sabre," (Nov. 23, 1993), all pages.
Duffy, Rick, "Fear This: Telnet Getaway to CompuServe," (Feb. 3, 1994), all pages.
Levine, John R., "Eaasy Sabre, OAG, and Other Online Airline Information FAQ," (Feb. 13, 1994), all pages.
Levine, John R., "Eaasy Sabre, OAG, and Other Online Airline Information FAQ," (Feb. 20, 1994), all pages.
Levine, John R., "Eaasy Sabre, OAG, end Other Online Airline Information FAQ," (Mar. 20, 1994), all pages.
Levine, John R., "Eaasy Sabre, OAG, and Other Online Airline Information FAQ," (Apr. 3, 1994), all pages.
Levine, John R., "Eaasy Sabre, OAG, and Other Online Airline Information FAQ," (May 2, 1994), all pages.
Moreno, Pedro J., "Internet Connection to Airlines Reservation System," (Jun. 9, 1992), all pages.
Broun, Adam, M., "Access to Eaasy Sabre Wanted," (Sep. 9, 1993), all pages.
Nallawalla, Ash, "Now CIS Access Via the Internet," The Age, (Mar. 22, 1994), all pages.
"Access to CompuServe from the Internet Available Now," PR Newswire, (Mar. 31, 1994), all pages.
Schurr, Amy, "CompuServe Internet Connection," PC Week, vol. 11, No. 17, (May 2, 1994), p. N/38.
Reed, Phillip, "10 Minute Guide to CompuServe," Alpha Books, (1994), all pages.
Miller, Michael, "Using CompuServe," Que Corporation, Second Edition, (1994), all pages.
Banks, Michael, "Welcome to CompuServe for Windows," MIS Press Books, (1994), all pages.
Schepp, Brad and Schepp, Debra, "The Complete Guide to CompuServe," Osborne-McGraw Hill, (1990), all pages.
Bilbo, Mark K., "Oue's Quick Guide to CompuServe," Que Corporation, (1992), all pages.
Tidrow, Rob, et al., "New Rider's Official CompuServe Yellow Pages," New Rider's Publishing, (1994), all pages.
Wagner, Rich, "Inside CompuServe, Second Edition," New Rider's Publishing, (1994), all pages.
Beatty, Grace Joely, et al., "Cruising America Online," Prime Publishing, (1994), all pages.
Benz, Christopher J., "How to Use America Online," Ziff-Davis Press, (1994), all pages.
Arca, Julie Ann and Linstrom, Richard T., "Inside CompuServe," New Rider's Publishing, (1990), all pages.
Bowen, Charles and Peyton, David, "CompuServe Information Manager the Complete Sourcebook," Bantam Books, (1990), all pages.
Wang, Wallace, "CompuServe for Dummies," IDG Books Worldwide, (1994), all pages.
Campbell Bob, "CompuServe CIM," Sybex, Inc., (1993), all pages.
Glossbrenner, Alfred, "Alfred Glossbrenner's Master Guide to CompuServe," Prentice Hall Press, (1987), all pages.
Lichty, Tom, "America Online's Internet MacIntosh Edition," Ventana Press, (1994), all pages.
Copeland, Duncan G., et al., "Sabre: The Development of Information Based Compentence and Execution of Information-Based Competition," IEEE Annuals of the History of Computing, vol. 17, No. 3, (1995), all pages.
"Apollo Format User'S Guide," Covia, (1991), all pages.
"Apollo Spectrum Directory Products Product Positioning Statement" Version 1.1 (Aug. 30, 1990).
Spiegel, Connie, et al., "1992 Product Planning," (Jul. 26, 1991), all pages.
"Spectrum Hotel Directory," Covia Partnership, (1994), all pages.
"Galileo Spectrum," Galileo Marketing, (1995), all pages.
"Spectrum 2.0 Information Pack," (Aug. 1994), all pages.
Graham, Ian S., "HTML, A Complete Guide to HTML" John Wiley & Sons, Inc. (1995), pp. 373-382.
San Francisco Reservations Worldwide Web Pages, (1995), all pages.
Lewis, Peter H., "Adventures in Cyberspace," The New York Times, (Dec. 11, 1994), all pages.
Stoneman, John, "Get Awayl," The Mac, (May 1995), all pages.
Engelman, Linda J., "Blink and You're There," Internet World, (Feb. 1995), all pages.
"The Best Travel WWW Site," West Coat Online, Version 3.03 (#27), (May 1995), all pages.
U.S. Patent No. 5,579,636 (Orlen, et al.).
U.S. Patent No. 5,032,989 (Tornetta).
"1991-1992 International GIS Sourcebook," GIS World, Inc., (1991), all pages.
U.S. Patent No. 3,614,328 (McNaughton, et al.).
Fedida, Sam and Malick, Rex, "The Viewdata Revolution," Halsted Press, (1979), all pages.
"Teletel Newsletter," Special Issue No. 2, (1987), all pages.
Fairlie, Rik, "Sabrevision Installs 700 Terminals," Travel Weekly, (Feb. 4, 1991), all pages.
Richards, Rhonda, "Travelers Set to Gain Control of Reservations," USA Today, (Oct. 28, 1993), all pages.
Fairlie, Rik, "Polishing Hotel's On-Screen Image," Travel Weekly, (Jul. 22, 1993), all pages.
"Vendor Goal 15,000 Sabrevision Units Online by Year's End," Travel Weekly, (Feb. 8, 1993), all pages.
Sayers, John and Miller, Rockley, "A Look Back: The Year in Review," Multimedia & Videodisc Monitor Future Systems, Inc., vol. 10, No. 1, (Jan. 1, 1992), all pages.
Newton, P.W., et al., "Networking Spatial Information Systems" Bellhaven Press, (1992), all pages.
Poon, Auliana, "Tourism, Technology and Competitive Strategies," CAB International, (1993), all pages.
Fryxell, David A., "Business Travel: San Francisco Dreamin," Link-Up, vol. 10, No. 1, (Jan. 1993), all pages.
Endicott, M.L.., "The Electronic Traveler, Directory of Tourism Information Sources," Enchiridion International, (1994), all pages.
Welch, Nathalie, "CompuServe, Dow Plug Into Internet," MacWeek, vol. 8, No. 12, (Mar. 21, 1994), all pages.
Schofield, Jack, "Microfile—CompuServe's New Services," The Guardian, (Mar. 24, 1994), all pages.
"A Piece of the Rock," Travel Weekly, (Mar. 8, 1993), all pages.
Fryxell, David A., "Around the World in One Day," Link-Up, vol. 7, No. 1, p. 16, (Jan. 1990), all pages.
Milligan, Michael, "NTA Begina Testing Its Aggressive Online Systems," Tour & Travel News, (Feb. 27, 1995), all pages.
"Management Group Buys Applied Information Services," Tour & Travel News, Issue 165, (Feb. 5, 1990), all pages.
Lofting, Christopher, "Menu on Travel Databank is Just the Tip of the Iceberg," Journal of Commerce, (Feb. 3, 1989), all pages.
Cronin, Mary J., "Doing Business on the Internet: How the Electronic Highway is Transforming American Companies," Van Nostrand Reinhold, (1994), all pages.
"Toward a Coordinated Spatial Data Infrastructure for the Nation," National Academy Press, (1993), all pages.
"Internet is Primary Focus of SLA Annual Conference," Information Technology Division of SLA, vol. 11, No. 3, (Summary 1994), all pages.
Silverman, Dwight, "Mosaic Cuts Through Internet's Cyber-Universe," Houston Chronicle, (Apr. 3, 1994), all pages.
"Bed & Breakfast Business," PC Week, vol. 6, No. 38, (Sep. 25, 1989), all pages.
Campbell, Bob, "Up & Running with CompuServe," Sybex, Inc., (1992), all pages.
Foster, Dennis L, "Reservations and Ticketing: Apollo, Second Edition," McGraw Hill, (1994), all pages.
Gunter, Talula, "Learning Apollo—Basic and Advanced Training," Delmar Publishing, (1994), all pages.
Capwell, Gerald K. and Resnick, Barry R., "Sabre Reservations, Basic and Advanced Training, Second Edition," South-Western Publishing Co., (1993), all pages.
Semer-Purzycki, Jeanne, "A Practical Guide to Sabre Reservations and Ticketing," (1992), all pages.
"Reservation and Ticketing with Sabre," 2nd Edition, McGraw Hill, (1994-95), all pages.
"Speakeasy," A Newsletter for Eaasy Sabre Subscribers, vol. VI, No. 1, (May 1992), all pages.

"CompuServe Almanac, Fourth Edition," CompuServe, Inc., (1988), all pages.
"The Communication Medium of the 90's Arrives Oct. 1st" Jaguar, vol. 1, No. 1, (1990-91), all pages.
"D&B—Dun's Electronic Yellow Pages" Dialgo Information Retrieval Service, (Sep. 1988), all pages.
"Searching Dialog the Complete Guide," Dialog Information Services, (Aug. 1987), all pages.
"D&B—Dun's Market Identifiers" Dialog information Retrieval Service, (Dec. 1988), all pages.
Dialog Chronolog "Internet Connection Available," (Dec. 1991), all pages.
"MapInfo for DOS, User's Guide Version 5.0," Mapping Information Systems Corporation, (1991), all pages.
"MapInfo for DOS, Command Reference Version 5.0," Mapping Information Systems Corporation, (1991), all pages.
"MapInfo Desk Mapping Software User's Guide," MapInfo Corporation, (1992), all pages.
"MapInfo Desktop Mapping Software Reference," MapInfo Corporation, (1992), all pages.
"MapInfo for Windows Getting Started," MapInfo Corporation, (1992), all pages.
"MapInfo Desktop Mapping Software Release Notes," (1985-1992), all pages.
"MapInfo User's Guide Version 1.1," MapInfo Corporation, (1990), all pages.
"MapInfo Command Reference Version 4.0," MapInfo Corporation, (1986), all pages.
Benzon, William Dr., "Desktop Mapping the MapInfo Way," MapInfo Press, (1990), all pages.
"MIDAS Tutorial Version 1.21," Mapping Information Systems Corporation, (May 1987), all pages.
"MIDAS User's Guide Version 1.21," Mapping Information Systems Corporation, (May 1987), all pages.
"MIDAS Technical Reference Version 1.21," Mapping Information Systems Corporation, (May 1987), all pages.
"MIDAS Command Reference Version 1.21," Mapping Information Systems Corporation, (May 1987), all pages.
"Maptnfo Microcomputer Mapping Software Version 2.00," Mapping Information System Corporation, (1988), all pages.
"The Software Sourcebook," Egghead Software, (1993), all pages.
Tetzeli, Rick, "Mapping for Dollars," Fortune, (Oct. 18, 1993), all pages.
Willmott, Don, "Four Programs Tell You Where to Go, What to Do," PC Magazine, (Apr. 27, 1993), all pages.
O'Reilly, Richard, "Map-Based Software Lets Your Fingers Do the Walking," Power Computing, (Feb. 1, 1993), all pages.
"Electronic Maps" PC Today, (Sep. 1993), all pages.
Swislow, William, "Can Map Software Measure UP?," Bradenton Hearld, (Sep. 5, 1993), all pages.
Schwabach, Bob, "Computer Map Software Finally Comes of Age," Vero Beach Press Journal, (Sep. 13, 1993.
Warner, Jack, "Local Expert Helps Travelers Find Beat Places to Go in a City," Atlanta Journal & Constitution, (Oct. 17, 1993), all pages.
"General Rent-A-Car Links with Worldspan's Accessplus," PR Newswire, (Jul. 9, 1991), all pages.
Rowe, Jeff, "Comnet, Worldspan Link Up to Expand Travel, Tour Services," The Orange County Register, (Jul. 31, 1990), all pages.
"Worldspan, THISCO to Develop Ultraswitch Second Stage," Aviation Daily, vol. 305, No. 62, (Sep. 26, 1991), all pages.
"Worldspan Negotiated Hotel Rate Capability Goes Global," Aviation Daily, vol. 307, No. 50, (Mar. 12, 1992), all pages.
"Worldspan to Add 10 Airlines to AccessPlus Program," Aviation Daily, vol. 308, No. 60, (Jun. 24, 1992), all pages.
"Worldspan Signs $100 Million Data Networking Deal with AT&T," Business Wire, (Feb. 24, 1993), all pages.
"Stratus Computer Wins $15 Millon Contract for Worldspan's Travel Reservations Network," Business Wire, (Mar. 2, 1993).
Ezell, Hank, "Worldspan Relocating 525 Jobs to Atlanta Area Most Positions Will Be at Galleria" The Atlanta Journal and Constitution, (May 7, 1993), all pages.
"Worldspan Acquires Pars Service Partnership," Aviation Daily, vol. 312, No. 26, p. 202, (May 6, 1993), all pages.

"Worldspan Releases 'Vacation Source by Travelfile'," Aviation Daily, vol. 312, No. 34, (May 18, 1993), all pages.
"Worldspan Signs $100 Million Agreement with IBM," PR Newswire, (Jun. 10, 1993), all pages.
Lassiter, Eric, "Worldspan to Provide Link to ETDN's," Travel Weekly, (Jun. 14, 1993), all pages.
"Worldspan Signs Distribution Agreement with Travelfile," Aviation Daily, vol. 309, No. 21, (Jul. 30. 1992), all pages.
Stone, John, "New Alliance for Worldspan, Amadeus; Gemini Strained," Tour & Travel News, (Sep. 7, 1992), all pages.
"Worldspan Offering Electronic Ads," Aviation Daily, vol. 315, No. 22, (Feb. 2, 1994), all pages.
"How Do You Move 2,367,069,000,000 Bytes of Information from Kansas City to Atlanta?" PR Newswire, (Oct. 20, 1993), all pages.
"Worldspan Signs $50 Million Contract with AT&T," Aviation Daily, vol. 313, No. 34, (Aug. 18, 1993), all pages.
"Proceedings of the Thirteenth Annual ESRI User Conference, vols. I-III," Environmental Systems Research Institute, (1993), vol. 1, pp. 575-584.
"Hotel & Travel Index," Winter 1991-92.
U.S. Patent No. 5,79535 (Orlen, et al.).
Memorandum Opinion and Order dated Apr. 6, 2005.
Deposition of Laslo Bardos dated Dec. 28, 2004.
GIS World, Inc., "First Annual Conference & Exposition on GIS in Business & Commerce" (May 11-13, 1992).
"Development History/Timeline" (1988-1996).
Navigational Technologies, "Albany and Rensselaer County Boards of Realty User's Group Meeting," (Jul. 14, 1986).
Deposition of Michael S. Saelens, dated Dec. 16, 2004.
"MapInfo Professional Version 4.0," (Nov. 1995).
"International GIS Sourcebook," (1991-1992).
Nahon, Georges and Ulrich, Marc, "It's not just an electronic phone book," Information Access Company, Sep. 15, 1986.
Deposition of Micheal Robinson dated Jan. 19, 2005.
Application for Servicemark Registration for "EAASY SABRE" (1988).
Jaguar Brochure.
Semer-Purzycki Jeanne, "A Practical Guide to Sabre Reservations and Ticketing," (1992), all pages.
Reservations and Ticketing with Sabre, 2nd Edition, McGraw Hill, (1994-95), all pages.
Borzo, Jeanette,"Sabre, Reed Tie Puts Jaguar in Jeopardy," Business Travel News (Aug. 14, 1989).
Stone, John, "Sabre, Reed Group to Develop Upgrade for Computer System," Tour & Travel News (Jul. 31, 1989).
Delrosso, Laura, "Automation Trends 'Bode Well' for Agencies, Sabre Official Says", Travel Weekly, (Mar. 2, 1992).
Sullivan, Jerry, "PC Expo Nov. 19-21: Chicago, IL," Multimedia & Videodisc Monitor Future Systems, Inc. (Feb. 1, 1992).
Sayers, John, et al., "A Look Back: The Year in Review," Multimedia & Videodisc Monitor Future Systems, Inc. (Jan. 1, 1992).
Mann, Mary, "CD Roms Booked As Storage Choice for Nationwide Travel Database Tool," PC Week, (Dec. 9, 1991).
Steinert-Threlkeld, Tom, "Tandy's New PCs Enter Multimedia Arena," The Dallas Morning News (Sep. 26, 1991).
"System Enhancements," Travel Weekly (Sep. 23, 1991).
Godwin, Nadine, "American to Issue Revision of Sabre PC Software Within Month," Travel Weekly (Aug. 26, 1991).
Mundy, Steve, "Plastic planes not enough for travel agent" Richmond Times-Dispatch (Apr. 22, 1991).
Dryden, Patrick, "News & Analysis New CD-Rom Support is Coming to Netware Servers," LAN Times (Apr. 1, 1991).
Steinert-Threkeld, Tom, "Pleasant departure new video displays, gagetry promise to improve air travel," The Dallas Morning News, (Mar. 16, 1991).
"Online, ICC, Reed Travel Group Team Up to Produce Jaguar on Sabrevision Hotel Directory," PR Newswire (Jan. 28, 1991).
Godwin, Nadine, "Cruise Lines 'Waking Up' to Electronic Marketing of Products," Travel Weekly (Sep. 20, 1990).
Amster, Robin, "Joining the Future," Travel Weekly (Aug. 30, 1990).
Stone, John, "Hyatt Announces Ad Contract with Jaguar-Sabrevision," Tour & Travel News (Jun. 18, 1990).

Borzo, Jeanette, "Sabre Adds Fare Check Programs: Increases Fees," Business Travel News (Jun. 18, 1990).
"Tech Briefs," Business Travel News (Jun. 18, 1990).
Wolff, Carlo, "Technology Will Set You Free; Computers, Comfort and Color Will Allow Hotel Staff to Provide Better Service, Experts Say," Lodging Hospitality, (Jun. 1, 1990).
Godwin, Nadine, "The Vision of the Future Incorporates the Technology of Today," Travel Weekly, (Apr. 19, 1990).
Stone, John, "Sabrevision Product Being Readied for Oct. 1 Launch," Tour & Travel News, (Mar. 5, 1990).
"Sabre, Reed Computer Products Due Out Oct. 1," Aviation Daily, p. 392, vol. 299, No. 39, (Feb. 26, 1990).
Press Release: "Edwardian is First U.K. Hotel Chain to Sign Up for Full Participation in Jaguar," (Oct. 23, 1990).
Press Release: "One of the Courtry's Leading Motel Management Companies Sees Jaguar As a Cost-Efficient Means to Increase Business" (Oct. 12, 1990).
"BPA Completes First Audit of Electronic Medium," The Morgan Report on Directory Publishing, (Jan. 1992).
"Asian Meetings & Incentives Incorporating Conferences and Exhibitions," Jan. 1992.
Deposition of Craig Cartwright dated Jan. 4, 2005.
"Apollo Format User Guide," Covia Partnership (1991).
"Apollo Spectrum Directory Products—Product Positioning Statement, Version 1.1" (Aug. 30, 1990).
"Spectrum Product Strategy—A Review With Senior Management," Covia (Nov. 9, 1992) (Galileo Deposition Exhibit 6).
Brochure: "Spectrum Hotel Directory," Covia Partnership (1992) (Galileo Deposition Exhibit 7).
"Spectrum Business Plan, Jan. 1993".
"Information Pack—Aug. 1994 Spectrum 2.0 CD-Rom Based Mapping and Hotel Information" (Galileo Deposition Exhibit 15).
Fairlie, Rik, "Apollo, Sabre Reach A Virtual Tie for U.S. Travel Agency Installations," Travel Weekly, (Nov. 5, 1993).
Stone, John, "AAA, Apollo to Link Hotel Res Systems," Tour & Travel News (Nov. 8, 1993).
Durbin, Fran, "AAA Inks Deal With Apollo for Roommaster Computer Link," Travel Weekly (Nov. 1, 1993).
Brisson, Mary, "Covia, Galileo Wind Up Merger Process," Business Travel News (Sep. 27, 1993).
Arrendell, Stephen and Lassister, Eric, "The Nation's Largest—Travel Weekly Magazine's Travel Agency Rankings for 1993," Travel Weekly (Jul. 29, 1993).
Godwin, Nadine "Advances in Leisure Technology Seen," Travel Weekly (Jun. 24, 1993).
Long, Dina, "Automated Tour Bookins Go On-Line," Tour & Travel News (Mar. 22, 1993).
Brisson, Mary, "Galileo/Covia Stfueture Is Set," Business Travel News (Mar. 22, 1993).
Stone, John "Hotel Co., Links to CRS—Covia, Radisson Launch 'Roommaster Inside Availability' on Apollo" Tour & Travel News (Mar. 8, 1993).
"Covia Announces New Apollo CRS Advertising Product" Aviation Daily (Sep. 3, 1991).
Woodring, Carol D. and Huck, Gail S. "Reservations and Ticketing: Apollo" (1991).
Deposition of Bonnie Reynolds dated Jan. 6, 2005.
Hobby, Jason "Amadeus Reservations System Consortium Seeks Help From U.S. Rival Sabre" Computer Weekly (Nov. 15, 1990).
"Amadeus, Sabre Sign Long-Term Marketing Agreement" Aviation Daily (Nov. 19, 1990).
"Computer Reservation News" Airline Business (Jan. 1, 1992).
"Firm Designs System for Multiple CRS Access From Single PC" Travel Weekly (Nov. 16, 1992).
"Rules and Reservations—Airline Computer Reservation Systems" Airline Business (Aug. 1, 1993).
"Site II Demographic Analysis Package User's Guide" (1976).
"Supersite User's Guide" C.A.C.I. Market Analysis Division Market Intelligence for Decision Makers (1984).
Weide, K. and Pascal, J. "CompuServe fur Windows" (1994).
"Information Bulletin (Western Association of Map Libraries)" (1995).
"PARS Key Car System" PARS Travel Information System (1989).

"PARS Car Key System Data Base Manual" Worldspan Travel Agency Information Services (1991).
Newton, P.W., et al., "Networking Spatial Information Systems" (1992).
Borzo, Jeanette "Demo 93 brings out diverse products; PIM, word processing, mapping, image products on display" (Feb. 15, 1993).
"Strategic Mapping Introduces Next Generation of Desktop Mapping" Business Wire (Nov. 1, 1993).
"Electronic Maps" PC Today (Sep. 1993).
O'Reilly, Richard "Map-Based Software Let's Your Fingers Do The Walking" (Oct. 16, 1988).
Brochure: "Atlast Software Product Summary" Strategic Mapping, Inc. (Winter/Spring 1993).
"The Software Source Book" Egghead Software (1993).
Declaration of Nicholas Berry dated Nov. 3, 1999 filed in *CIVIX-DDI, LLC v. Microsoft Corporation, et al.*, Civil Action No. 99-B-172 (D. Colo.) and Declaration of Mark Atherton dated Nov. 3, 1999 filed in *CIVIS-DDI, LLC v. Microsoft Corporation, et al.*, Civil Action No. 99-B-172 (D. Colo.).
"Automap the easiest way to get from here to there Autompa road atlas".
"Automap Road Atlas for Windows User Guide".
"Automap Road Atlas—The Easiest Way to Get from Here to There" (1994).
"Autoroute Plus Version 6" Nextbase Limited (1992-93).
Fryxell, David A, "Business Travel: San Francisco deramin" Learned Information, Inc. (Jan. 1993).
"CompuServe, Dow Plug Into Internet" MacWEEK, Ziff-Davis Publishing (Mar. 21, 1994).
Endicott, M.L., "The Electronic Traveler Directory of Tourism Information Sources" (1994).
"A Year Filled with Victories and Setbacks" Travel Agent (Nov. 7, 1994).
"American Airlines' Sabre and Applied Information Services Announce Exciting New Product That Will Revolutionize the Travel Industry" Southwest Newswire, Inc. (Apr. 24, 1989).
"American Airlines' Sabre and Applied Information Services Announces Exciting New Product That Will . . . " PR Newswire (Apr. 24, 1989).
"American Airlines' Sabre end Applied Information Services Announce New Product for Travel Industry" Business Wire (Apr. 24, 1989).
"Racal acquires Interlan" Computerworld (May 1, 1989).
Holsomback, Barbara "SABRE Service Targets Leisure Traveler" A/S/M Communications, Inc. (May 1, 1989).
"Apollo CRS Adds TravelFile Database" McGraw-Hill, Inc., Aviation Daily (Nov. 21, 1991).
"Applied Information Services Communication Servers and Command Modules" Applied Information Services, Inc. (1995).
Stone, John "Autofile Targets Tour Operators to Join CRS Programs" Tour & Travel News (Apr. 15, 1991).
Lincoln, Lori and Godwin, Nadine "Automation Marketplace" Travel Weekly, (Sep. 30, 1991).
Ferguson, Bob "Gray Line Signs New Overseas Tour Operations" Tour & Travel News (Nov. 4, 1991).
Smith Juliano, Suzanne "Bonaire Hopes to Show It's Not Just For Divers" Tour & Travel News (Mar. 13, 1995).
Fryxell, David A. "The Information Hunt for Leisure Travel: The Case of Bonny Scotland" Learned Information, Inc. (Jan. 1993).
Henderson, Danna K. "Getting 'Information, not just data' latest from airline computer reservation industry" Air Transport World (Aug. 1989).
"CMP Acquires Applied Information Services, electronic pubishing firm" Business Wire (Nov. 9, 1988).
"Ledger" Newsday, Inc. (Nov. 10, 1988).
"Covia Launches Electronic Travel Information Catalog" McGraw-Hill, Inc. Aviation Daily (Apr. 2, 1992).
Stone, John "Covia Signs Pact to Add Database of Tour Operators" Tour & Travel news (Dec. 5, 1988).
Rubin, Karen "Agents, Suppliers Take Steps to Profit from Videotex" Tour & Travel News (Jan. 23, 1989).
Jones, David "CTO Inks Deal with ORG/TravelFile for Info on CRSs" Tour & Travel News (Jul. 6, 1992).

"CTO Reaches Out to Agents, Consumers via Worldwide Web" Travel Weekly (Aug. 17, 1995).
Elder, Martin "CTO's Future Focus" Travel Agent (Aug. 28, 1995).
Gregor, Anne "Dialing Up the Bulletin Board" Los Angeles Times (May 22, 1994).
Gregor, Anne "Dialing Up the Bulletin Board Technology" Los Angeles Times (May 22, 1994).
ASI Travel Parnters (Nov. 10, 2004).
Rubin, Karen "Agents, Suppliers Take Step to Profit From Videotex" Tour & Travel News (Jan. 23, 1989).
Jones, David "CTO Inks Deal With ORG/TravelFile for Info on CRSs," Jul. 6, 1992.
"List Provides a Comprehensive Overview of Automation Vendors" Travel Weekly (Sep. 7, 1989).
"Management Group Buys Applied Info. Services" Tour & Travel News (Feb. 5, 1990).
Smith, Suzanne "Many Four Operators Are Crossing Their Fingers" Tour & Travel News (Dec. 13, 1993).
"Maui Group Seeks Corporate Sponsors to Bankroll Promotions" Travel Weekly (Jul. 14, 1994).
Roberti, Mark "No Future Shock: Its Today's Realty Growth in enduser computerized airline line ticket reservation" Tour & Travel News (Mar. 7, 1994).
"Norway Board Joins Data Base" Travel Weekly (May 30, 1994).
"NTA Bolsters Communications" Travel Agent (Nov. 7, 1994).
Smith Juliano, Suzanne "NTA Info On-Line in CRS Travel Agents to Use New Vacations On-Line Computer" Tour & Travel News (Nov. 7, 1994).
Milligan, Michael "NTA On-Line Delayed National Tour Assn. Delays Introduction of NTA/Tour & Travel Shop Information System" Tour & Travel news (Dec. 26, 1994).
Vis, David "NTA to debut electronic bookings with 30 tour operators on Aug. 1" Travel Weekly (Jul. 31, 1995).
"The Official Airline Guide Electronic Edition Travel Service is now available on GEnie" PR Newswire (Feb. 21, 1989).
"National Online Meeting" Learned Information Inc. (Mar. 1989).
Milligan, Michael "National Four Association Reaches Out to Retailers" Tour & Travel News (Apr. 17, 1995).
Golden, Fran "Network Strives to Make B&Bs Easier to Book" Travel Weekly (Jan. 17, 1994).
"New Caledonia: French flair off the coast of Australia" Travel Weekly (Dec. 16, 1996).
Milligan, Michael "On-Line in '95" Travel Agent (Oct. 3, 1994).
"Ontos, Inc. recently announced Release 2.2 of its Ontos DB database" Network World, Inc. (Apr. 6, 1992).
"Orange County Newsmakers" Los Angeles Times (Apr. 24, 1991).
Turbak Gary "High tech travel planning" American Forests (Mar.-Apr. 1991).
Sutor-Terrero. Ruthanne "Orlando Plans Agents Contest" Tour & Travel News (Mar. 29, 1993).
Article: Paradise found; travel industry online services, Author: David Fryxel, Date: Jan. 1992, Information Today, Inc.
Dorsey, Jennifer "Paris-based agency group plans on-line service for members" Travel Weekly (Jul. 17, 1995).
"Pata Data to be in CRSS" Travel Weekly (Apr. 4, 1994).
Article: Pathways to Productivity and Profitability, Date: Nov. 14, 1994, Tour & Travel News.
"Pride of Africa" Travel Agent (Dec. 4, 1995).
"Reference Manual Designed for Agent Use" Travel Weekly (May 13, 1993).
Mays, Barbara J. "Regional data goes on-line" Travel Weekly (May 1, 1995).
Godwin, Nadine "Retailers buy home pages on ASTA's site" Travel Weekly (Nov. 13, 1995).
Ruggia, James "River of Change" Travel Agent (Apr. 17, 1995).
Scally, Robert "San Diego hotels suffer room gloom as rates, occupancy levels plummet" The Press Enterprise Co. (Nov. 28, 1993).
"Sabre, Apollo Agents Get CLIA Data" Tour & Travel News (Jun. 22, 1992).
Article: Rochester Visitors Group, Hotels Offer Inclusive Meeting Plans, Author: Therese J. Post, Date: May 13, 1993, Travel Weekly.
Post, Theresa J. "Rochester Visitors Group, Hotels Offer Inclusive Meeting Plans" Travel Weekly (May 13, 1993).
Sutor-Terrero, Ruthanne "Savanah Rooms to be Available on Res Systems" Tour & Travel News (May 10, 1993).
Del Rosso, Laura "San Francisco CVB Arranges Plans Featuring Monet Exhibit" Travel Weekly (Mar. 16, 1995).
"American Airlines' Sabre and Applied Information Services Announce Exciting New Product That Will Revolutionize the Travel Industry" Southwest Newswire, Inc., (Apr. 24, 1989).
"American Airlines' Sabre and Applied Information Services Announce Exciting New Product That Will Revolutionize the Travel Industry" PR Newswire Association, Inc. (Apr. 24, 1989).
"American Airlines' Sabre and Applied Information Services Announce New Product for Travel Industry" Business Wire, Inc. (Apr. 24, 1989).
"Racal acquires Interclan" Computerworld (May 1, 1989).
Holsomback, Barbara "Sabre Service Targets Leisure Traveler" A/S/M Communications Inc. (May 1, 1989).
"Apollo CRS Adds TravelFile Database" McGraw-Hill, Inc. Aviation Daily (Nov. 21, 1991).
Finch, Peter, et al. "Planning a trip? Let Your PC Do the Legwork" Business Week (Feb. 5, 1990).
Spritzer, Dinah A. "Tourism Officials Attempt to 'Do More With Less'" Travel Weekly (Mar. 12, 1992).
"Tours de Force" Travel Agent (Dec. 26, 1994).
"Tradition with Style" Travel Weekly (Oct. 26, 1995).
Fairlie, Rik "Travel Agents' Panel Looks at Ways Automation Can Boost Leisure Sales" Travel Weekly (Oct. 2, 1989).
Godwin, Nadine "CRS Product Development Is More Evolution Than Revolution" Travel Weekly (Oct. 26, 1989).
Godwin, Nadine "The Year in Automation Goes Beyond CRS News" Travel Weekly (Oct. 30, 1989).
Hurdle, Jon "Head Trips" Travel Weekly (Nov. 9, 1989).
Rubin, Karen "Trek America Upgrades Packages for Americans" Tour & Travel News (Feb. 6, 1989).
Rubin, Karen "Agents Create Adventure Specialty" Tour & Travel News (Feb. 6, 1989).
"Using Creative Methods" Travel Weekly (Apr. 23, 1992).
Post, Theresa J. "Visitors Bureau Aims to Increase Agent-Generated Business" Travel Weekly (May 6, 1993).
Caulk, Steve "Visitors Bureau Goes High-Tech" Denver Publishing Company (Mar. 22, 1994).
Schepp, Brad, et al. "The Complete Guide to CompuServe" (1990).
Lichty, Tom "America Online's Internet MacIntosh Edition" (1994).
Viescas, John L. "The Official Guide to the Prodigy Service" (1991).
Benz, Christopher J. "How to Use America Online" Ziff-Davis Press (1994).
Bowen, Charles and Peyton, David "CompuServe Information Manager The Complete Sourcebook" (1990).
Wang, Wallace "CompuServe for Dummies" IDGBooks Worldwide (1994).
Deposition of Eric Gustavson dated Dec. 21, 2004.
"Reservation Confirmation From San Francisco Reservation" (Sep. 30, 1994) (Gustavson Deposition Exhibit 12).
Email regarding praise (Mar. 2. 1995) (Gustavson Deposition Exhibit 13).
U.S. Patent No. 5,543,789 (Behr, et al.).
Sliwoski, Leonard J., "Online Commercial Services: Small Business Applications" Journal of Smell Business Management (Jul. 1, 1987).
Ojala, Marydee "Company directories online: Trinet and Dun's" Online (Sep. 1, 1988).
"ABI directory on Dialog" (American Business Information) Information Today (Apr. 1, 1992).
"D&B Dun's Electronic Yellow Pages Dialog File 515" (Sep. 1988).
"Searching Dialog: The Complete Guide" Dialog Information Services, Inc. (Aug. 1987).
"Search Aids for Use with Dialog Database" Dialog Information Services, Inc. (1987).
"D&B Dun's Market identiners on Top Dun's Martel Indentifiers" Dialog Information Services, Inc. (1988) (Kaminecki Deposition Exhibit 4).
"Send Your Dialog Alert" (Nov. 1991) (Kaminecki Deposition Exhibit 6).
"Internet Connection Available," The Dialog Corporation (Dec. 1991) (Kaminecki Deposition Exhibit 7).

Cronin, Mary J. "Doing Business on the Internet How the Electronic Highway is Transforming American Companies" Van Nostrand Reinhold (1994).
"Toward a Coordinated Spatial Data Infrastructure for the Nation" National Academy of Sciences (1993).
"Proceedings of the Thirteenth Annual ESRI User Conference, vol. 1" Environmental Systems Research Institute, Inc. (1993).
"Proceedings of the Thirteenth Annual ESRI User Conference, vol. 2" Environmental Systems Research Institute, Inc. (1993).
"Internet Is Primary Focus of SLA Annual Conference" vol. 11, No. 3 (Summer 1994): Commerical Use of the Internet,the Virtual Land Rush of the Nineties (48851, p. 2).
"A Little History of the World Wide Web" (Apr. 11, 2005).
"U.S. Government Plans and Proposals on NSF Backbone to the Internet" (Apr. 1993).
Rutkowski, Kathy "Unit 2 Lecture Hypertext, Hypermedia Hypermedium " (1999-2000).
Silverman, Dwight "Mosiac Cuts Through Internet's Cyber Universe" Houston Chronicle (Apr. 3, 1994).
Rowe, Megan "Sailing on the Internet" Penton Publishing Inc. (Jun. 1996).
"California Hyatts Include Special" Business Wire (Jun. 23, 1995).
"Internet Results" Travel Agent (Nov. 21, 1994).
Lewis, Peter H. "Internet Gets Cyber-Travelers on Their Way" The Sunday Patriot-News Harrisburg (Dec. 25, 1994).
"Volume Isn't Everything" USA Today (Mar. 21, 1995).
Article: Southwest Airlines offer link to hotel information through internet home page, Date: Jun. 16, 1995, PR Newswire.
McDonald, Michele "Sabre Unveils No Frill Lines' Booking Level" Travel Weekly Magazine (Jan. 19, 1995).
Memorandum of Defendants Microsoft in Opposition to CIVIX's Motion for Summary Judgment of Infringement and in Support of Microsoft's Cross Motion for Summary Judgment of Patent Invalidity Fled in *CIVIX-DDI, LLC* v. *Microsoft Corporation*, Civil Action No. 99-B-172 (D. Colo.) dated Nov. 5, 1999.
ISD Financial Development Projects Apr. 1993.
ISD Development and Support Projects, Apr. 1990.
ISD Development and Support Projects, May 1989.
ISD Development and Support Projects, May 1991.
ISD Development and Support Projects, May 1992.
ISD Development and Support Projects, Nov. 1991.
CIS Travel Billing, Mar. 1994.
CIS Prof Billing, Mar. 1994.
Operations Overview, Apr. 1993.
Monthly Report, Nov. 1982.
Videotex Technology, Oct. 1992.
Monthly Status Report, Feb. 1987.
Application Development & Support, Dec. 1993.
Application Development & Support, Apr. 1989.
Application Development & Support, Jan. 1990.
Application Development & Support, Nov. 1987.
Application Develpoment & Support, Feb. 1994.
Application Development & Support, Feb. 1994.
Product Development Overview, Apr. 1991.
Product Development Overview, May 1993.
Email Nov. 8, 2003 re: CompuServe History.
PARS-HMI System High-Level Design Document, Aug. 28, 1989 Version 3.0.
Microsoft Corporation's Response to CIVIX-DDI, LLC's First Set of Interrogatories to Defendants filed in *CIVIX-DDI, LLC* v. *Microsoft Corporation, et al,*, Civil Action No. 99-B-172 (D. Colo).
Order dated Nov. 24, 2004 entered in *CIVIX-DDI, LLC* v. *Expedia, Inc.*, et al. Civil Action No. 03 C 3792 (N.D. Ill.).
Memorandum Opinion and Order dated Apr. 8, 2005 entered in *CIVIX-DDI, LLC* v. *Expedia, Inc.*, et al, Civil Action No. 03 C 3792 (N.D. Ill.).
Memorandum Opinion and Order dated Sep. 14, 2005 entered in *CIVIX-DDI, LLC* v. *Expedia, Inc.*, et al, Civil Action No. 03 C 3792 (N.D. Ill).
Sep. 14, 2005 Memorandum Opinion and Order entered in *CIVIX-DDI, LLC* v. *Motorola, et al.*, Civil Action No. 03 C 3792 (N.D. Ill).
Order dated Sep. 27, 2005 entered in *CIVIX-DDI, LLC* v. *Expedia, Inc.*, et al, Civil Action No. 03 C 3792 (N.D. Ill).

VIDEO—"Sleepless in Seattle" © 1993 TriStar Pictures, Inc.
St.Eve, A. J. (US District Court Judge); *Memorandum Opinion and Order re CIVIX et al* vs. *Cellco Partnership et al.*; United States District Court, Northern District of Illinois, Case No. 03 C 3792: Apr. 6, 2005; pp. 1-30.
"NYNEX Offers Yellow Pages Over the Internet," Information Today, Sep. 1994. VIS 06208.
"Delphi Makes NortheastAccess More Accessible Flexibily," AccessUpdate, Jan./Feb. 1993, vol. 2, No. 1. VIS 10749-10752.
"NYNEX NortheastAccess—In Development," AccessUpdate, Jul./Aug. 1992, vol. 1, No. 1, VIS 10753-10756.
"SNET Gives Northeast Access Users Access to Connecticut," AccessUpdate, Summer 1993, vol. 2, No. 2., VIS 10757-10760.
"Nynex Introduces Nynex USACCESS™ on French Minitel," NYNEX Information Technologies Company Press Release, Oct. 24, 1990., VIS 10792-10794.
NYNEX Interactive Yellow Pages on Prodigy, Screen Shots, 1995, VIS 11210-11249.
NYNEX Interactive Yellow Pages on Prodigy, Miscellaneous Screen Shots, Jan. 24, 1995. (VIS 11197-11199. VIS 10792-10804).
"Welcome to the Nynex Interactive Yellow Pages," Backgrounder, NYNEX Information Technologies Co. (1995), VIS 11200-11202.
Nahon, George. "It's Not Just an Electronic Phone Book," Telephone Engineer & Management, Sep. 15, 1986 p. 85 & p. 88. (VIS 06230 & VIS 06233).
"Nynex Offers Yellow Pages Over the Internet," Information Today, Sep. 1, 1994, VIS 05015.
"Here's the Stuff You Requested," NYNEX Interactive Yellow Pages (Mar. 1995), VIS 10805-10822.
NYNEX Interactive Yellow Pages, Screen Shots (1995) VIS 10823-10855.
Trinet Establishment Database, Dialog® Information Retrieval Service (1985), VIS 05108-VIS 05157.
Keays, Thomas. "Searching Online Database Services Over the Internet," Online, Jan. 1993, VIS 06130-06134.
"Nynex Yellow Pages Unit Offers On-Line Service," Newsbytes News Network, Feb. 2, 1992 (VIS 05079-05080).
"NYNEX chooses Minitel to distribute online directory," Information Today, Jun. 6, 1992 (VIS 05081).
"NYNEX completes national CD-ROM telephone Directory," Information Today, Apr. 1, 1992 (VIS 05092).
Dialog Delivery Options—A Complete Package, The Dialog Corporation, Oct. 1994. (VIS 11397-11463).
"The Dialog Computer System." (Aug. 1987). VIS 06748-07277.
"Nynex introduces forerunner of electronic yellow pages." Information Today, Apr. 1, 1992 (VIS 05095-05096.
D&B—Dun's Market Identifiers, Dialog Information Retrieval Service, Dec. 1988. pp. 516-1 through 516-68.
D&B-Dun's Electronic Yellow Pages. Dialog Information Retrieval Service, pp. 515-1 through 515-48.
"Nynex to Offer Yellow Pages on the Internet," Nynex Information Technologies News Release, Aug. 1, 1994, p. 1-2.
Nynex NortheastAccess Information Sheets, Screen Shots, VIS 10784-VIS10785.
"Les Pages Jaunes de New York et Boston," les Echos, Jan. 30, 1991. La Guerre du Golfe, p. 6. VIS 11345-VIS 11346.
"Marketing Public Relations Status Report," Creamer, Dickson Bashford, Mar. 2, 1992. Various Press Releases & News Items. VIS 11350-VIS 11396.
"Delphi Internet, The Official Guide", Delphi Internet Services Corporation, 1994. EXP064089-EXP064394.
"Electronic Directories in the United States," Hilary B. Thomas, Interactive Telecommunications Services, Inc., Aug. 31, 1993. (EXP0722223-072323).
"Accessing and Working with the McKinley Data," Design Specification, The NYNEX Interactive Yellow Pages World Wide Web Service, Oct. 10, 1995, pp. 5-2 to 5-3..(VIS 11312-11313).
"Nynex Announces Online, Interactive Yellow Pages on Prodigy," NYNEX Interactive Yellow Pages News Release, Jan. 24, 1995 VIS 11203-11205.
NYNEX Expands On-Line Directory Services to U.S. West Community Link Gateway, NYNEX Information Technologies News Release, Jun. 23, 1992. VIS 10766-10768.

"NYNEX Becomes First Rebox to Offer Interactive Online Transaction Service," NYNEX Information Technologies News Release, Jul. 23, 1993 (VIS 10769-10772).
Samet, Hanai, et. al, "Quadtree Region Representation in Cartography: Experimental Results," IEEE Transactions on Systems, Man and Cybernetics, Nov./Dec. 1987 (EXP 025059-64).
Samet, Hanan, "The Quadtree and Related Hierarchical Data Structures," Computing Surveys, Jun. 1984 (EXP 025066-103).
Harris, Clyde B., et al. IEEE Plans '88 Position Location and Navigation Symposium, Record, "Navigation into the 21$^{st}$ Century,"
"Digital Map Dependent Functions of Automatic Vehicle Location Systems," Department of Surveying Engineering, University of Calgary (1988) (EXP 025567-76).
Marsh, David, Conference Record of Papers presented at the First Vehicle Navigation and Information Conference (VNIS '89), "Database Design, Development and Access Considerations for Automotive Navigation," Navigation Technologies Corp., Sunnyvalle, CA (1989) (EXP 025577-81).
Antenucci, J. & Von Nostrand, Reinhold. Geographic Information Systems: A Guide to the Technology, New York, NY 1991 (EXP 31759-032093).
Magure, Goodchild, and Rhind, Geographical Information Systems (1991). EXP 030617-031437.
Norman, Alan; Zavoli, Walter B.; Heideman, Mike, "Vehicle Information Systems & Electronic Display Technology," Society of Automotive Engineers, 1991. (EXP 017103-09).
White, Marvin, "Emerging Requirements for Digital Maps for In-Vehicle Pathfinding and Other Traveler Assistance," Marvin White, Society of Automotive Engineers, 1991.
Rillings, James H. "TravTek," Vehicle Navigation & Information Systems Conference Proceedings VNIS '91. (EXP 025591-600).
Taylor, Kent B. "TravTek—Information and Services Center," Vehicle Navigation & Information Systems Conference Proceedings, VNIS '91. (EXP025601-12).
Yang, T.A., Hancock, P.A. "Geographic Databases for IVHS Management," Applications of Advanced Technologies in Transportation in Engineering, 1991 (EXP 017110-116).
Laurini, Robert; Thompson, Derek. Fundamentals of Spatial Information Systems, 1992.
Newton, et al., "Networking Spatial Information Systems," Bellhaven Press, London, England, 1992 (EXP 033897-EXP 034187).
"An Intelligent Vehicle Highway Information Management System," Sashi Shekhar et al., Microcomputers in Civil Engineering (1993) (EXP 017078-102).
Proceedings of the Thirteenth Annual ESRI User Conference, copyright 1993, "Implementation of a Wide Area Information Server (WAIS) Software to Disseminate Spatial Data on the Internet." (EXP 030477-488).
Sigmod 93 Proceedings, 1993 (EXP 017117-28).
Proceedings of the IEEE-IEE Vehicle Navigations Systems Conference, Ottawa, Ontario, Oct. 12-15, 1993 (EXP 025493-97).
Rehfeld, John, et al., "Customer Location Services," Vehicle Navigation & Information Systems Conference Proceedings, Yokahama, Japan, Aug. 31-Sep. 2, 1994. (EXP 025523-28).
Vehicle Navigation & Information Systems Conference Proceedings, Yokahama, Japan, Personal Dynamic Maps Based on Distributed Georgaphic Information Services, Masatoshi ARIKA WA, Hiroshima City University, Aug. 31-Sep. 2, 1994 (EXP 025529-35).
IEEE 1994 Position, Location and Navigation Symposium, Tidget TIM Mayday System for Motorists, Alison Brown and Randy Silva, Apr. 11-15, 1994 (EXP 025541-48).
IEEE 1994 Position, Location and Navigation Symposium, Use of Mobitex Wireless Wide Area Networks as a Solution to Land-Based Positioning and Navigation, Thomas T. Yang and Kai Yan Yip, Apr. 11-15, 1994 (EXP 025559-66).
Proceedings of the Fourteenth Annual ESRI User Conference, copyright 1994, "GIS," May 1994. (EXP 025484-92).
CompuServe Information Manager, The Complete Sourcebook; Charles Bowen and David Petyon; Bantam Books, 1990.
Navigating the Internet with Prodigy; Ned Johnson; Sams.net Publishing, 1995.
Navigating the Internet with America Online; Wes Tatters; Sams.net Publishing, 1994.
Reservations and Ticketing with SABRE; Dennis L. Foster; Glencoe/McGraw-Hill, 1995.
"Doing Business on the Internet: How the Electronic Highway is Transforming American Companies," Mary J. Cronin, Jan. 1994.
"Advertising: Where it is now, Where it is going, How to Profit From New Opportunities." Interactive Yellow Pages and Electronic Directory Publishing. The Seventh Annual Conference, Yellow Pages Publishing Association, Nov. 1-3, 1993.
CIVIX-DDI, LLC., vs. Expedia, Inc., et al. Case No. 03C3792. Expedia, Inc.'s Sixth Supplemental Objections and Response to Civix's First Set of Interrogatories, including Exhibits A-L.
CIVIS-DDI, LLC. Vs. Cellco Partnership d/ba Verizon Wireless; Expedia, Inc; Travelscape, Inc.; and Verizon Information Services, Inc. Verizon Information Service's Supplemental Objections and Response to CIVIX's Interrogatory No. 3.,Sep. 30, 2004.
Jaguar—compilation of articles, Trade Show Circulars, Screen Shots, 1990-1991, EXP072057-EXP072138.
"Travelers set to gain control of reservations," USA Today, Oct. 26, 1993. (Factiva Archive).
"Polishing Hotel' On-Screen Image; Seminar Shows How Properties Can Improve Reliability of CRS Data," by Rick Fairlie, Travel Weekly, Jul. 22, 1993 (Factiva Archive).
"Vendor Goal: 15,000 Sabrevision Units on Line by Year's End." Travel Weekly, Feb. 8, 1993 (Factiva Archive).
"Automation Trends 'Bode Well' for Agencies, SABRE Official Says," by Laura Del Rosso, Travel Weekly, Mar. 2, 1992 (Factiva Archive).
PC Expo Nov. 19-21: Chicago IL., Multimedia & Videodisc Monitor, Future Systems, Inc., Feb. 1, 1992.
"A Look Back: The Year in Review," Multimedia & Videodisc Monitor, Jan. 1, 1993. Future Systems, Inc. (Factiva Archive).
"BR travel agencies are keeping ahead of computer game," Cynthia V. Campbell, The Baton Rouge Sunday Advocate, Dec. 15, 1991.
"CD ROMS Booked As Storage Choice for Nationwide Travel Database Tool," by Mary Mann, PC Week, Dec. 9, 1991.
"Infobits," IDP Report, Simba Information, Inc., Dec. 6, 1991 (Factiva Archive).
"Applications Line: 6,500 Sabrevision Systems Sold to Date," Multimedia & Videodisc Monitor, Future Systems, Inc., Dec. 1, 1991.
"Sabre 25 Percent Above Sabrevision Sales Plan," Aviation Daily, Oct. 10, 1991. (Factiva Archive).
"Survey Assesses Agents' Use of Jaguar Hotel System," Travel Weekly, Oct. 7, 1991. (Factiva Archive).
"Tandy's new PCs enter multimedia arena," The Dallas Morning News, Sep. 26, 1991. (Factiva Archive).
"Systems Enhancements." Travel Weekly, Sep. 23, 1991. (Factiva Archive).
"Covia Spotlights Electronic Maps in Video System," John Stone, Tour & Travel News, Sep. 9, 1991.
"American to Issue Revision of Sabre PC Software Within Month," by Nadine Godwin, Aug. 26, 1991. (Factiva Archive).
"AA boasts of new systems." Steve Polilli, Software Magazine, May 1, 1991.
"Plastic planes not enough for travel agent," Steve Mundy, Richmond Times-Dispatch, Apr. 22, 1991. (Factiva Archive).
"New CD-ROM Support is Coming to Netware Servers," Patrick Dryden, LAN Times, Apr. 1, 1991.
"Pleasant departure new video displays, gadgetry promise to improve air travel." Tom Steinert-Threkeld, The Dallas Morning News, Mar. 16, 1991.
World IRIS Available on Datas II. Rik Fairlie. Travel Weekly. Feb. 28, 1991.
"Sabrevision Installs 700 Terminals; Growth Rate is 40 Per Day." Rik Fairlie, Travel Weekly, Feb. 6, 1991 (Factiva Archive).
"Online, ICC, Reed Travel Group Team Up to Produce Jaguar on Sabrevision Hotel Directory," PR Newswire, Jan. 28, 1991.
"Debut Set for Spectrum Video System," Rik Fairlie, Travel Weekly, Dec. 20, 1990.
"Sabrevision Officially Goes on Line." Rik Fairlie. Travel Weekly, Oct. 1, 1990. (Factiva Archive).

"Cruise Lines 'Waking Up' to Electronic Marketing of Products," by Nadine Godwin, Travel Weekly, Sep. 20, 1990. (Factiva Archive).
"Joining the Future," Robin Amster, Travel Weekly, Aug. 30, 1990. (Factiva Archive).
"Major Agencies OK Installation of Sabrevision," Rik Fairlie, Travel Weekly. Jun. 18, 1990. (Factiva Archive).
"Hyatt Announces AD Contract with Jaguar-Sabrevision," John Stone, Tour & Travel News, Jun. 18, 1990. (Factiva Archive).
"Sabre Adds Fare-Check Programs, Increases Fees," Jeanette Borzo. Business Travel News, Jun. 18, 1990. (Factiva Archive).
"Tech Briefs," Tech Briefs, Business Travel News, Jun. 18, 1990.
"Technology Will Set you Free." Carlo Wolff, Lodging Hospitality, Jun. 1, 1990.
"The vision of the future incorporates the technology of today." Nadine Godwin, Travel Weekly. Apr. 19, 1990. (Factiva archive).
'Sabrevision' Product Being Readied for Oct. 1 Launch. John Stone, Tour & Travel News., Mar. 5, 1990.
"Sabre Video Res System to be Ready in October," Jeanette Borzo, Business Travel News, Mar. 5, 1990. (Factiva archive).
"Sabrevision prepares for Oct. Debut; Jaguar Data Base Will be First Offered on System," Nadine Godwin, Feb. 26, 1990.
"Sabre, Reed Computer Products Due Oct. 1," Aviation Daily, Feb. 26, 1990.
Vehicle Navigation & Information Systems Conference Proceedings, Yokahoma, Japan, Customer Location Services, Walt Zavoli, Gary L. Latshaw, John Rehfeld. Aug. 31-Sep. 2, 1994 (EXP 025523-EXP 025528).
GIS World, Jun. 1992. PC's vs. Workstations—Looking Beyond the Hype. (EXP 032253-EXP 032360).

* cited by examiner

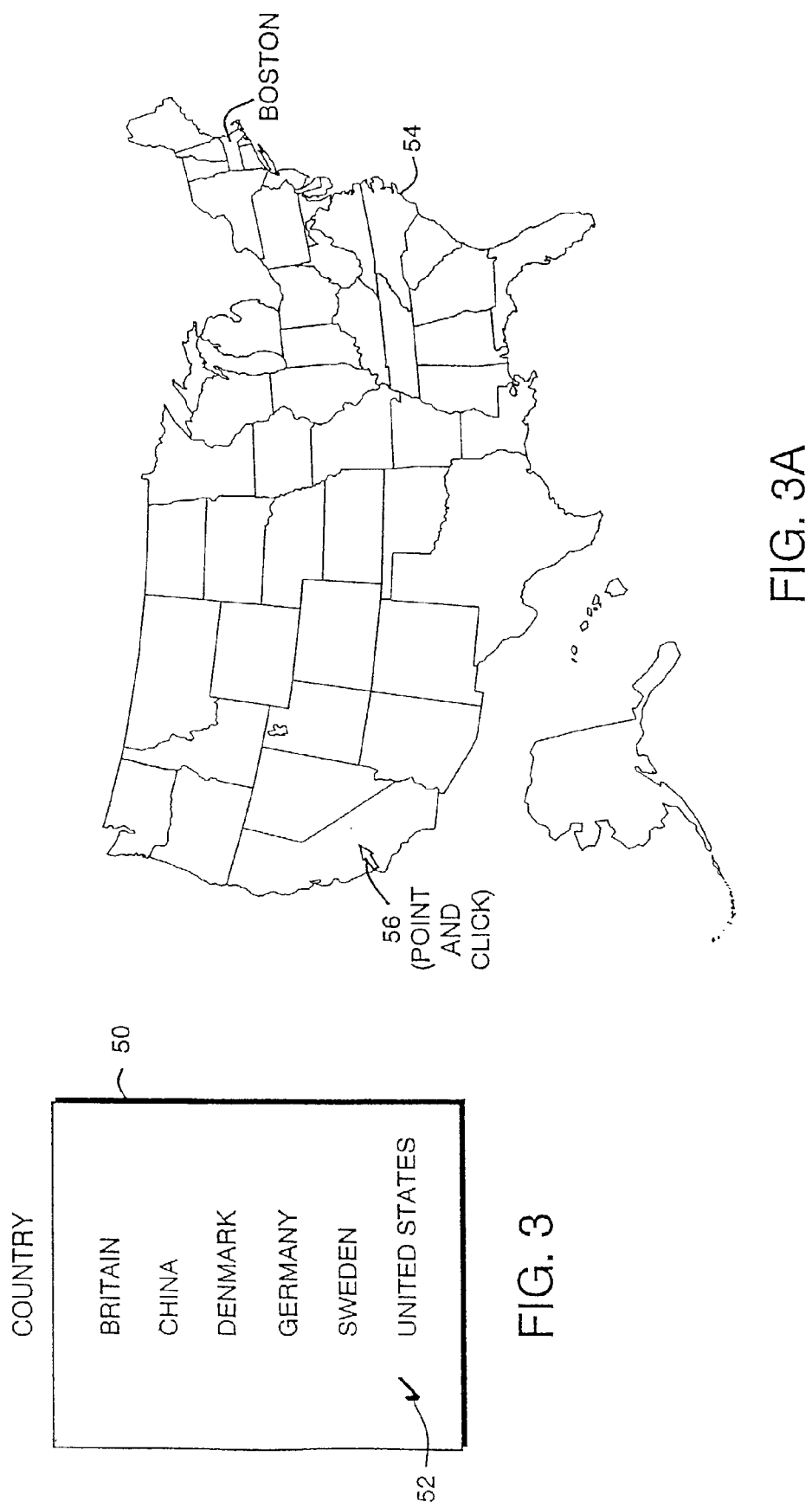

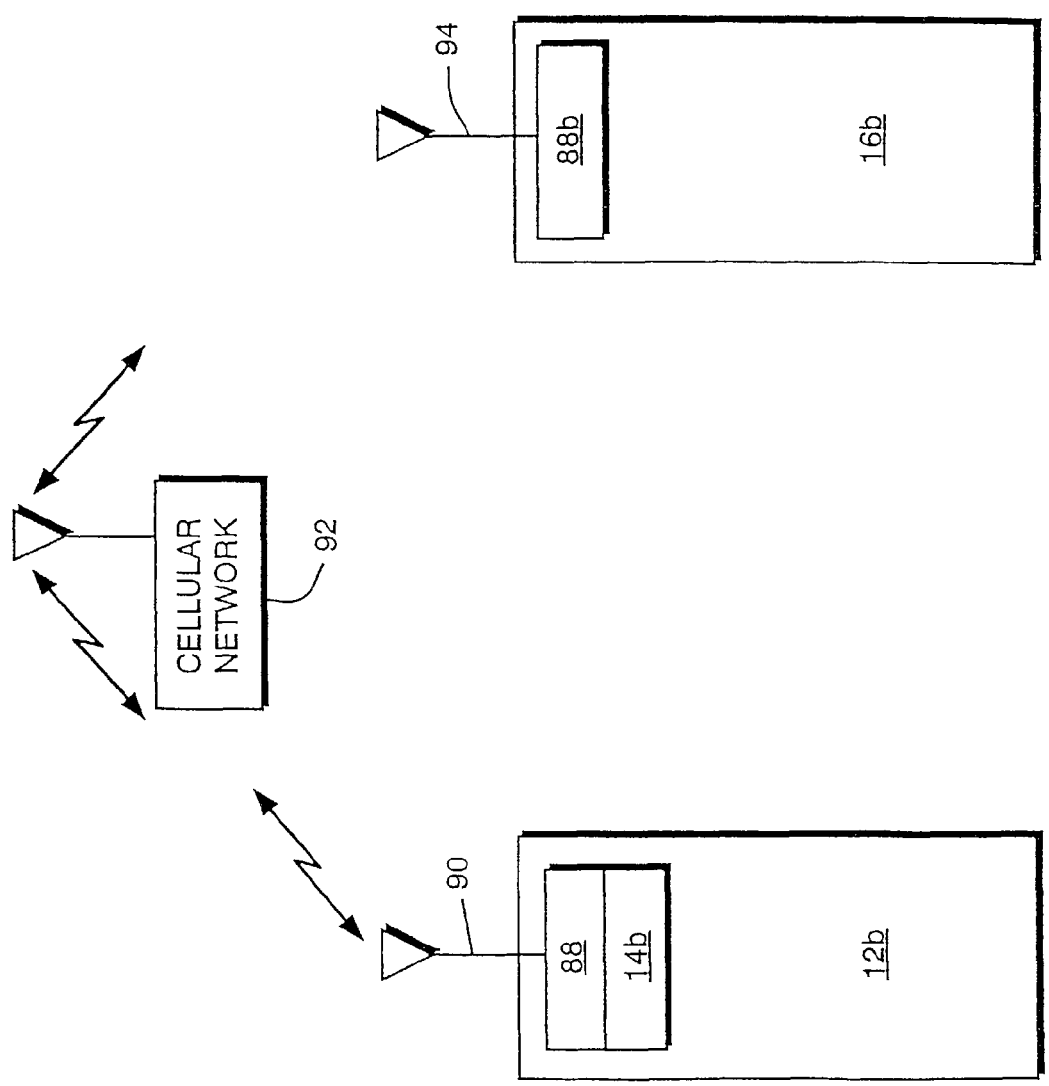

METHOD FOR ADVERTISING INFORMATION

Related Application

This is a continuing application of commonly owned U.S. patent application Ser. No. 09/816,829, filed Mar. 23, 2001 (now U.S. Pat. No. 6,415,291), which is a continuation of Ser. No. 08/920,044, filed Aug. 28, 1997 (now U.S. Pat. No. 6,408,307), which is a continuation of U.S. patent application Ser. No. 08/371,425, filed Jan. 11, 1995 (now U.S. Pat. No. 5,682,525).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING

This application contains a computer program listing appendix contained within a compact disc and incorporated herein by reference.

BACKGROUND OF THE INVENTION

Electronic directories for identifying selected subscribers within a city are known in the prior art. For example, U.S. Pat. No. 4,974,170 describes one system which includes a fixed kiosk with an internal memory for storing locations such as businesses and historical sites within a predetermined distance from the kiosk. An input panel on the kiosk provides access to the data within the memory, and a map is generated by the system thereby locating the selected information from the kiosk.

However, such a system is inflexible. The map generated by the system is predefined; and thus the user cannot access or select information about businesses and historical sites outside of the predefined map. A user of the system must also know the exact location of the kiosk in order to use the system. Tourists and business travelers to the city are unlikely to know of the kiosk; and thus the kiosk system is of little use to such users. Further, a user must be physically present at the kiosk in order to access the information about the businesses and/or sites in the surrounding area.

In addition, the information stored within the kiosk's memory must be manually updated. This requires a series of cumbersome steps—including the physical acts of loading and downloading to the memory at the kiosk—to update the system in the event that information about a selected business changes, e.g., the business closes.

It is, accordingly, an object of the invention to provide systems and methods which reduce or remove the aforementioned difficulties.

It is yet another object of the invention to provide a system for remotely accessing selective items of interest from a database; and for displaying a geographic vicinity of the items of interest to the user selectively and at the remote location.

Still another object of the invention is to provide a system for remotely providing information identifying locations of selected items of interest at a selected destination location.

These and other objects will be apparent in the specification which follows.

SUMMARY OF THE INVENTION

As used herein, "items of interest" means services, products, geographic sites, architectural sites, stores, restaurants, public services, and other items which a user of the invention may wish to locate. "Port," "remote access port," "terminal," or "remote access terminal" are used interchangeably to denote a terminal, e.g., a personal computer with modem, from which a user of the invention can access the database storing the information about the items of interest. "Remote database" or "database" are used herein to denote a database, e.g., a client server, which stores information for access by a user of the invention from a port. "Communication link" is used to denote means, including for example a telephone line, for communicating between the database and the port. "Geographic vicinity," and "map" are used to denote a geographic region which includes and surrounds selected items of interest.

In one aspect, the invention provides a system for remotely determining the position of a selected category of items of interest in a selected geographic vicinity from a database. A database stores information about a plurality of items of interest, including, for each of the items of interest, positional coordinates, a geographic vicinity, and at least one associated category. A communications link facilitates communications between a user of the system and the database. The system also provides for transmitting a portion of the information in the database to a user via the link upon receipt of a request signal representative of a selected category and geographic vicinity. Preferably, that transmitted portion of the information includes identification of a position for the items of interest within the selected category and geographic vicinity. The system further provides a port for remotely accessing the portion of information via the link. Specifically, the port generates the request signal in response to inputs by a user of the system; that signal being representative of the selected category and geographic vicinity. A user interface at the port accepts the inputs and communicates the position of each of the items of interest in the selected category and geographic vicinity to the user.

In accord with other aspects of the invention, the communications link can include several technologies, including a telephone link, satellite link, radio-frequency link, infra-red link, internet link, facsimile link, fiber-optic link, coaxial cable link and television link. The database is, typically, a personal computer, mainframe, work-station, mini-computer, or digital data processor. To communicate the information to a user, the user interface can include a television, telephone, facsimile, audible speaker, and/or personal computer display. To accept user inputs at the port, the user interface can further include a television interface, telephone interface, facsimile interface, and/or a personal computer interface.

Preferably, the geographic vicinity includes certain spatial detail of the items of interest. For example, the geographic vicinity can include a map of the items of interest in the selected category, as well as street and landmark information displayed relative to the user's position at the remote port. As such, the set of positional coordinates generally identifies either (i) a location of a user of the system, or (ii) a destination location within the geographic vicinity.

In certain aspects of the invention, the information within the database further includes additional detail about at least one of the items of interest. Such a feature is advantageous in that, once the port displays the geographic vicinity with the items of interest, a user can thereafter select further additional detail about one or more of the items of interest. In this manner, for example, an item of interest such as a restaurant can display a picture of the interior of the restaurant to the user. The additional detail can include other multimedia information, such as video, prerecorded music, and digital pictures.

In still another aspect, the invention also communicates at least one advertisement associated with at least one of the items of interest to the user. As such, certain advertisers that are connected with the selected category of items of interest can promote a name or business.

In one aspect of the invention, the information within the database is arranged hierarchically. In this aspect, there are a plurality of discrete geographic vicinities (each set of positional coordinates corresponding to one discrete location within the geographic vicinity). The system thus provides for hierarchically selecting any of the discrete vicinities from the port in a hierarchical manner.

In still another aspect of the invention, database apparatus is provided for storing information about a plurality of items of interest. As above, that information includes, for each of the items of interest, positional coordinates, a geographic vicinity, and at least one associated category. A communications link provides for communicating between a user of the database apparatus and a remote port. The database apparatus further provides for transmitting a portion of the information to a user via the link upon receipt of a request signal representative of a geographic vicinity and a selected category of the items of interest. That transmitted portion of the information includes an identification of a position for the items of interest within the selected category and geographic vicinity.

The invention also provides, in another aspect, a remote access port for remotely accessing a selected category of items of interest in a selected geographic vicinity from a database such as described above. The port includes means for generating a request signal representative of a selected category and a selected geographic vicinity of the items of interest in response to inputs by a user of the port. A user interface accepts the inputs and indicates the position of each of the items of interest within the selected category and geographic vicinity.

In another aspect, the information includes additional detail for at least one of the items of interest, and the port further includes means for (i) generating a signal representative of a selection of at least one of the items of interest, and (ii) communicating the additional detail to the user.

The invention also provides a method for remotely determining the position of a selected category of items of interest in a selected geographic vicinity from a database, comprising the steps of: (i) storing information about a plurality of items of interest in the database, the information including, for each of the items of interest, positional coordinates, a geographic vicinity, and at least one associated category; (ii) accessing the database from a remote location and over a communication link; (iii) communicating, from the remote location, information representative of a selected category and a selected geographic vicinity to the database; and (iv) transmitting a portion of the information from the database and to the user over the link, the information including, at least, identification of a position for the items of interest within the selected category and geographic vicinity.

The invention is next described further in connection with preferred embodiments, and it will be apparent that various additions, subtractions, and modifications can be made by those skilled in the art without departing from the scope of the invention.

BRIEF DESCRIPTION OF THE ILLUSTRATE EMBODIMENTS

A more complete understanding of the invention may be obtained by reference to the drawings, in which:

FIG. 1 schematically illustrates a system constructed according to the invention;

FIG. 3 shows a user interface display of various worldwide countries providing selectable locations according to the invention and which can be displayed to a user of the system of FIG. 1;

FIG. 3A shows a user interface display of a map of the United States providing selectable locations according to the invention and which can be displayed to a user of the system of FIG. 1;

FIGS. 6A and 6B illustrate various components and methods, according to the invention, for constructing a communications link suitable for use in the system of FIG. 1;

Figure 1:
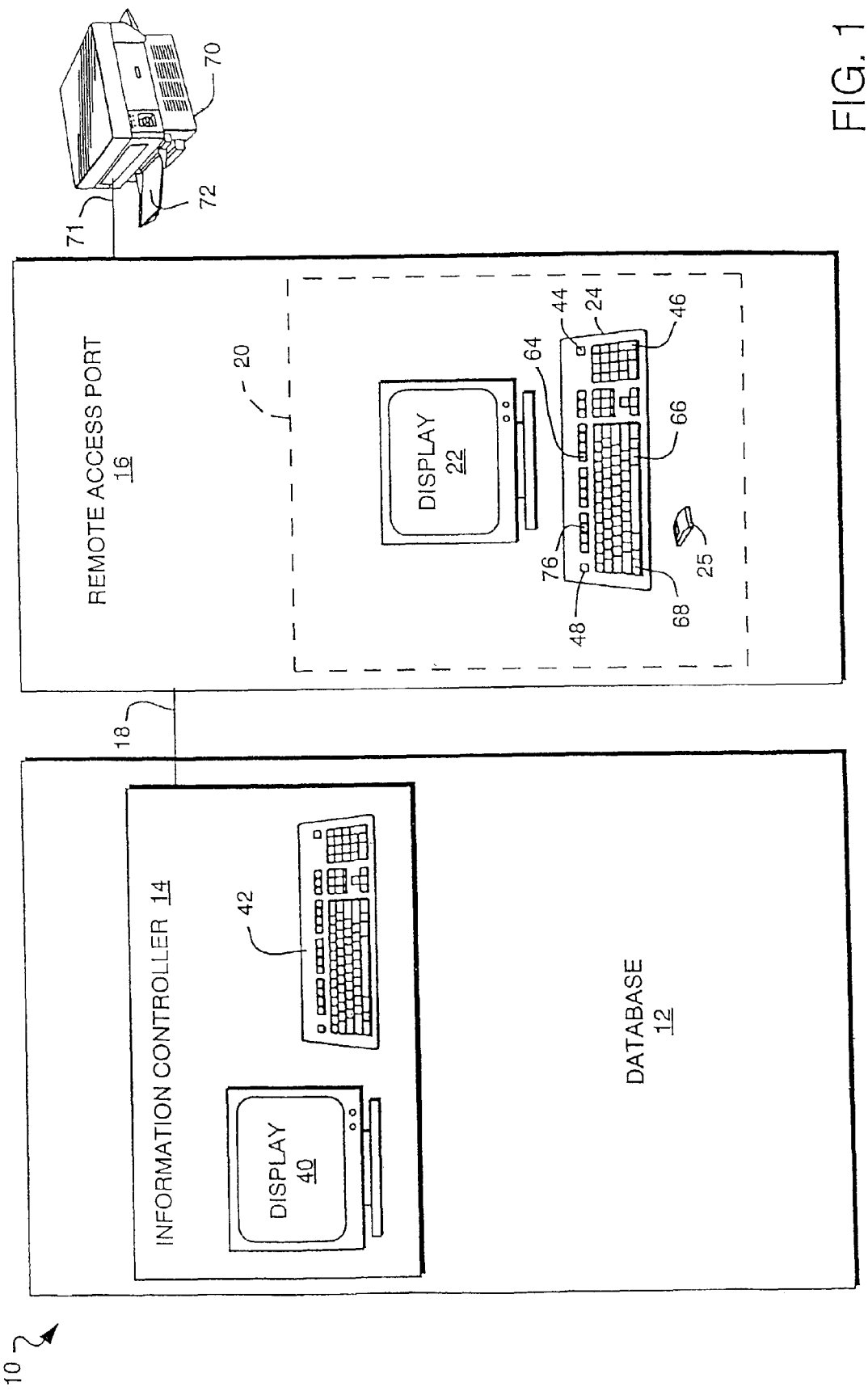
Figure 9:
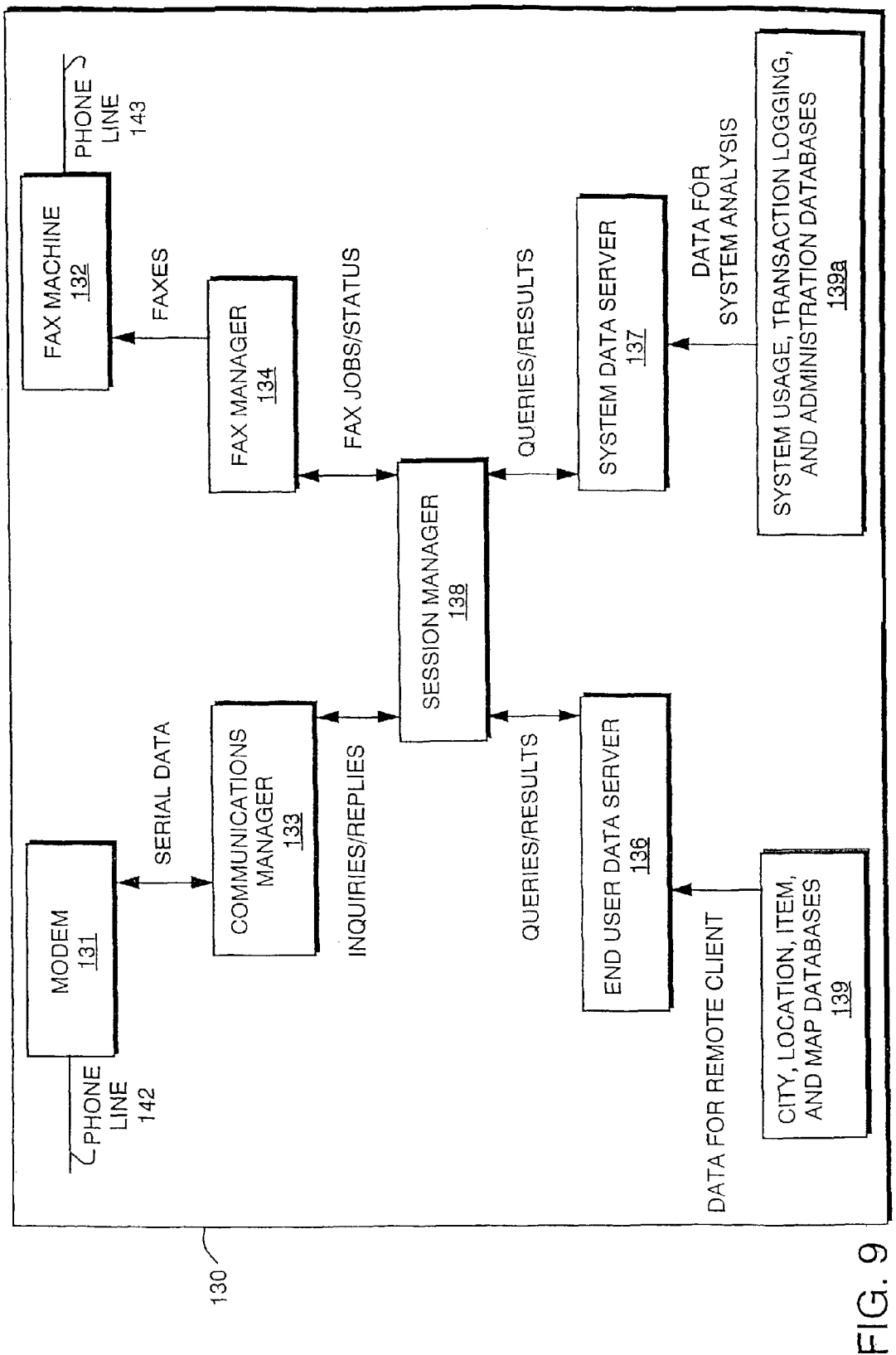
Figure 10:
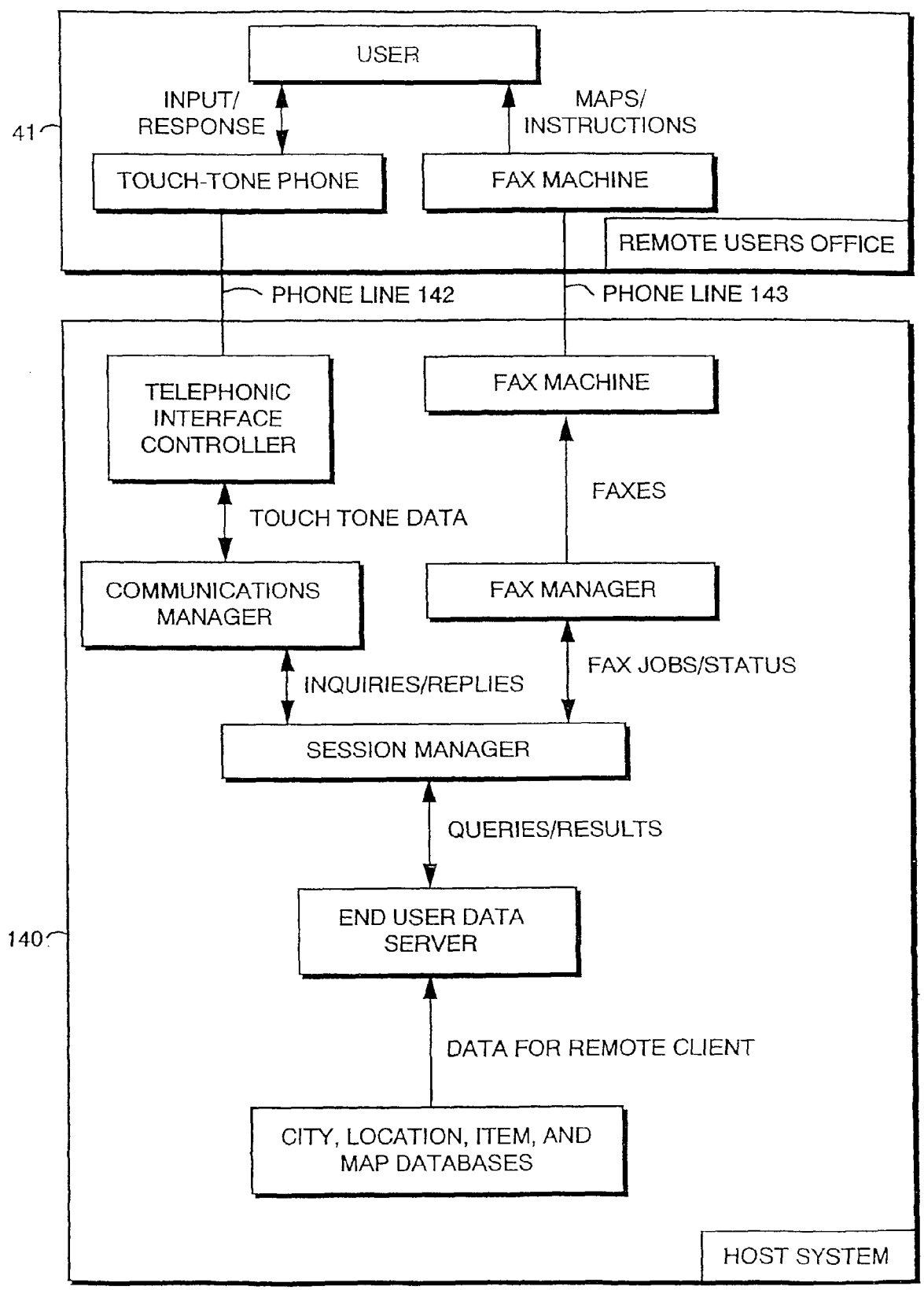
Figure 11:
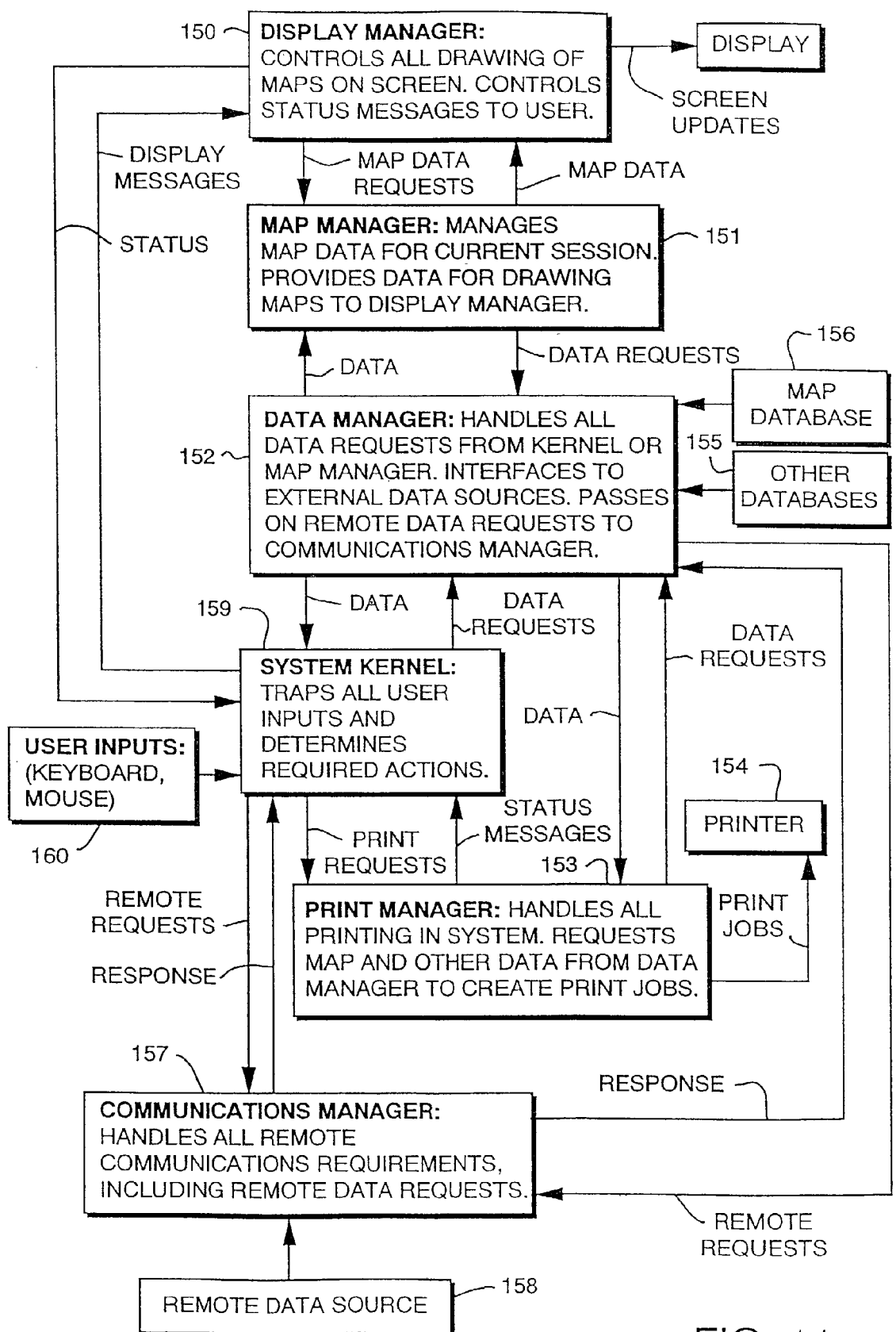
Figure 12:
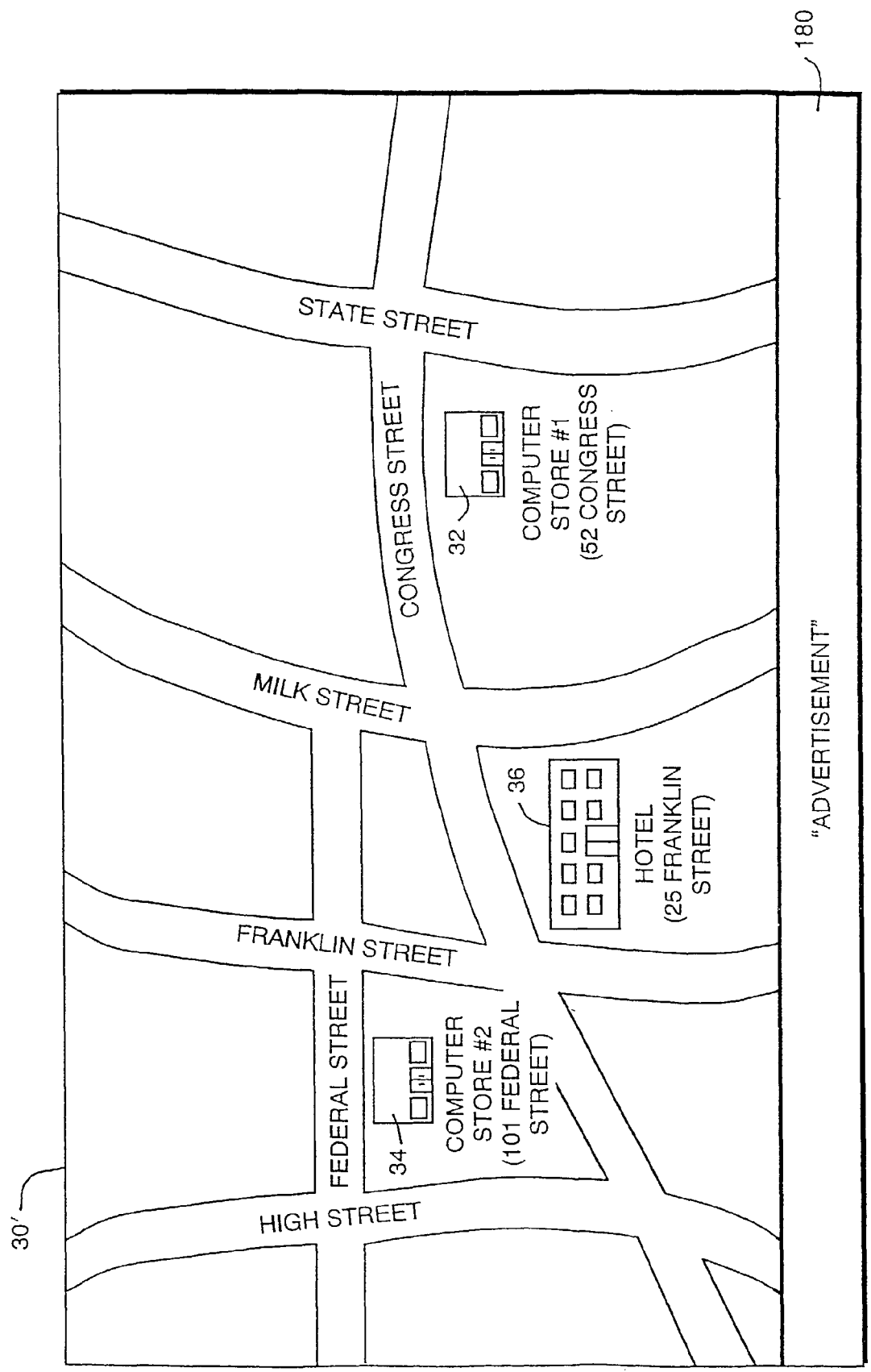

FIG. 9 schematically illustrates system architecture, constructed according to the invention, which forms a database suitable for use as the database of FIG. 1, and which services both phone and fax information and internal administrative data;

FIG. 10 shows one system architecture according to the invention, and which includes a host database and a remote port;

FIG. 11 illustrates process flow and system architecture for interfacing between user inputs and the database, in accord with the invention; and FIG. 12 shows one representative display or print-out, according to the invention, which includes an advertising field associated with the items of interest.

DETAILED DESCRIPTION

FIG. 1 illustrates a system 10 constructed according to the invention. A database 12 stores information about the items of interest, including information about locating the items of interest. The database 12 includes an information controller 14 which communicates with a remote access port 16 via a communications link 18 and which controls the access and flow of information into and out of the database 12. The information within the database 12 is accessible by the remote access port 16 upon request by a user of the port 16. Accordingly, the port 16 preferably includes a user interface section 20 which provides a graphical display 22, keyboard 24, and mouse tracker 25 (for pointing and clicking on selected display items within the display 22).

Figure 2:
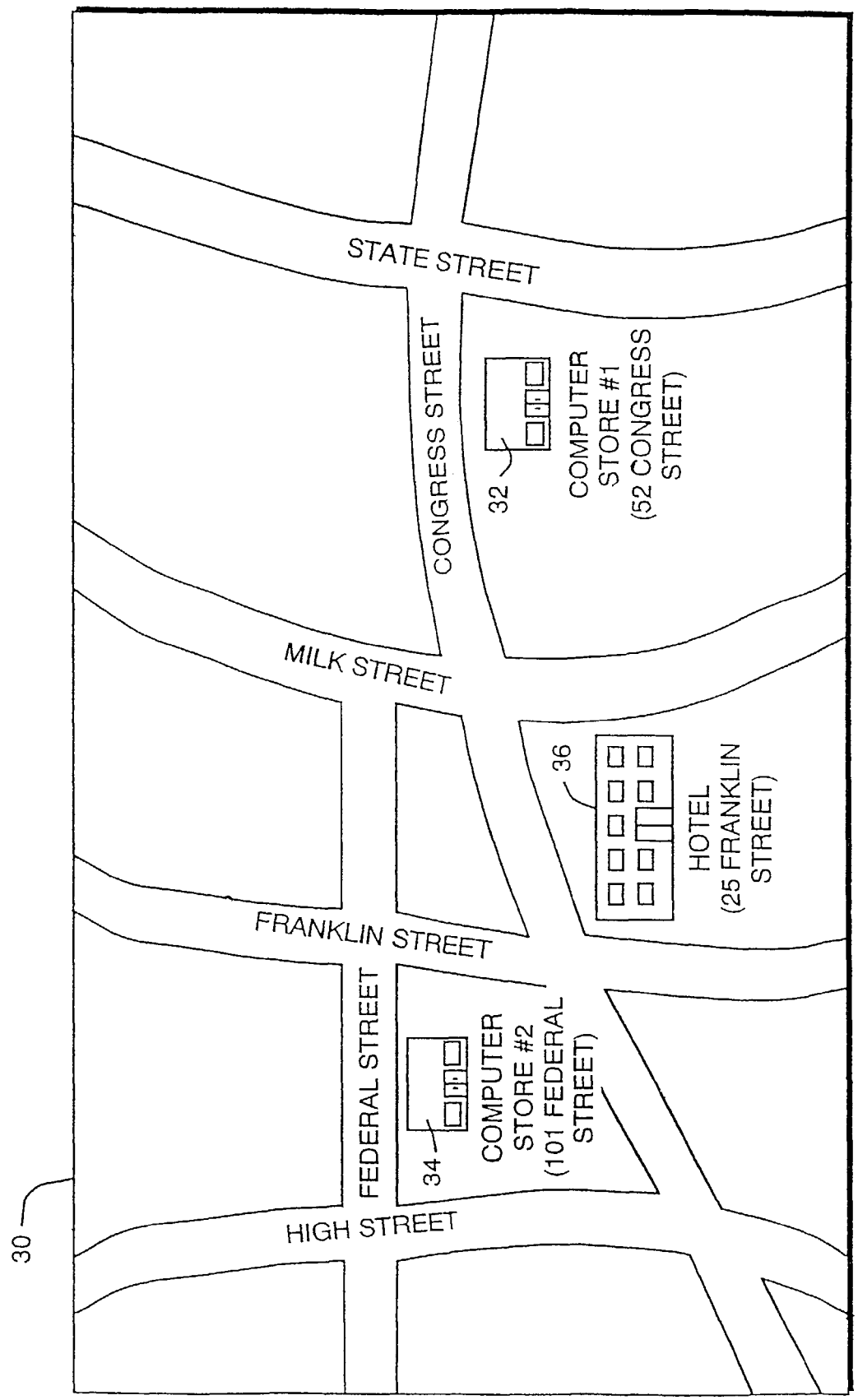
FIG. 2 shows a typical graphical illustration locating items of interest and which can be displayed to a user of the system of FIG. 1.

Specifically, the information within the database 12 includes, for each of the items of interest, positional coordinates, a geographic vicinity, and at least one associated category. Preferably, this information includes a graphical representation so that a user can easily interpret the information. FIG. 2 shows one exemplary display 30 of information locating computer products in downtown Boston, Mass. Accordingly, the associated category in this example is "computer products," and, in the illustrated display 30, the geographic vicinity includes the selected items of interest, including (i) the two computer stores 32, 34 at, respectively, 52 Congress Street and 101 Federal Street; and (ii) that area which is displayed within the display 30 and which surrounds the items of interest, such as that area displayed between the streets of High Street and State Street.

The positional coordinates, as part of the selected information, operate to locate the geographic vicinity. Briefly, the positional coordinates locate one location within the geographic vicinity—such as the center of the vicinity—so that items of interest can be determined relative to the positional coordinates and within the geographic vicinity. In addition, the geographic vicinity is preferably a rectangle of information, with North situated upwards.

In one preferred aspect of the invention, the display 30 is centered relative to the location of the user (as such, the positional coordinates of the information are set to the user's present position). For example, if the hotel 36 at 25 Franklin Street has a port 16 therein, a user of the invention can (i) access that particular port and hence the information within the database 12, and (ii) display the items of interest relative to the user's current location, i.e., at the hotel 36. Accordingly, in this embodiment, the display 30 is generated with the hotel 36 at the center of the display—corresponding to the positional coordinates of 25 Franklin Street—and the selected items of interest in the associated category are displayed on streets relative to the hotel 36. In this fashion, a user can easily walk or drive to the items of interest after leaving the hotel 36. Such a feature also gives the "appearance" to the user that the hotel 36 is at the center of activity, a desirable marketing feature for the invention.

With further reference to FIG. 1, the controller 14 preferably includes a display 40 and a keyboard 42 so that an operator of the system 10 can add and modify the information within the database 12. This is especially useful because information about the items of interest changes regularly; and thus the information within the database 12 is preferably updated on a regular basis so that users of the system 12 receive accurate information. For example, in a typical commercial location such as illustrated in FIG. 2, new retail stores open and existing retail stores close throughout the year. The invention thus provides for updating information within the database 12, such as through the control of a system operator typing commands at the keyboard 42.

Alternatively, the system 10 provides for remotely updating the database 12 with new information via any of the ports 16 or via a remote computer with a modem, described in more detail in connection with FIG. 6A. Specifically, the controller 14 provides access security which allows only authorized access for modification of the database 12. As such, a system administrator at a remote port 16 can download information to the database, or modify existing information within the database, as needed and without physically operating the keyboard 42.

The communications link 18 of the invention can take many forms. It is generally impractical to "hard-wire" each remote access port 16 to the database 12; so the form of the communications link 18 generally includes existing communication networks, such as one or more of the following: telephone lines, fiber-optic cabling, satellite communications, cellular communications, radio and microwave-frequency communicators, infra-red communicators, the facsimile mechanism, airphones, modems, the internet, co-axial cabling, television including interactive TV communications, and the like. These communication networks and subsystems are readily known to those skilled in the art without further reference hereto. Nevertheless, FIGS. 6A-6B illustrate representative communication links, according to the invention, which comprise one or more of these communication networks.

Figure 7B:
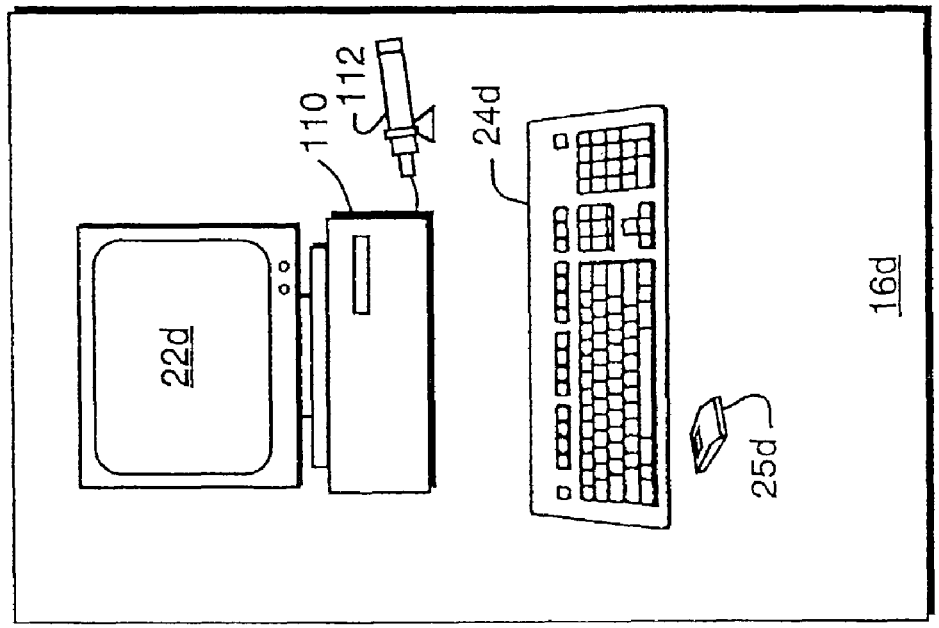
FIGS. 7A and 7B illustrate various remote port display technologies, according to the invention, which are suitable for use within the remote port of the system of FIG. 1.
Figure 7A:
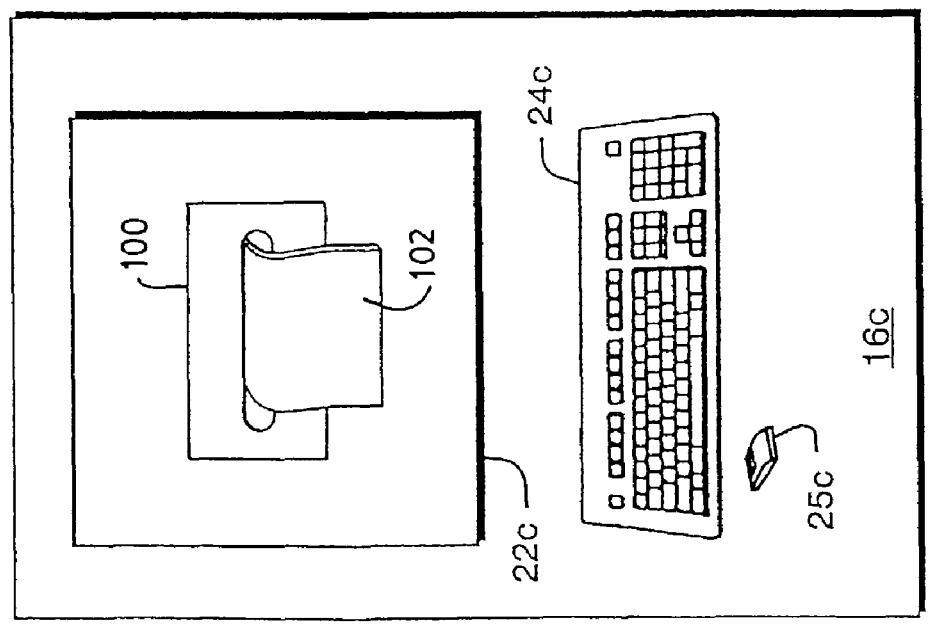

The displays 22 and 40 of FIG. 1 include those displays known to those skilled in the art, including the cathode-ray-tube (CRT), Liquid Crystal Display (LCD), and an array of Light Emitting Diodes (LEDs). However, the display 22 can also take the form of a paper or voice communication port, such as a facsimile output (hard-copy), printer, a voice communication synthesizer with automated digitized voice responses, a voice-driven menu systems, or as other devices capable of rendering digitized or analogue output signals. FIGS. 7A and 7B below illustrate some of these alternative forms of the display 22.

The remote access port 16 is generally provided at locations of public access in a city. Accordingly, the invention supports a nearly unlimited number of ports 16 that are connected for communication with the database 12, each of the ports being connected to the database 12 such as shown in FIG. 1 and such as described in more detail below. For example, the port 16 of the invention is appropriately placed in one or more hotels, restaurants, and public facilities (such as a train station) in the city. In Boston, Mass., therefore, the port 16 of the invention would ideally be accessible at several different locations, particularly at busy locations, such as at (i) North and South Stations, (ii) Logan Airport and at each of the several airport terminals, (iii) within several (or many, if not all) of Boston's hotels and restaurants, and (iv) at car rental locations.

The invention provides, generally, two modes of operation for a user accessing _ the port 16. In the first mode of operation, the user within the desired geographic vicinity accesses the database through the port 16 for information about the items of interest located near-by. This mode was described in connection with FIG. 2. That is, when the user is located within the geographic vicinity, e.g., at the hotel 36, a user can locate any of the items of interest relative to the hotel 36 and display items of interest in the associated category, e.g., computer products, through a street map connecting streets to and from the hotel 36. In this manner, as described above, a user can easily locate the items of interest from his or her present location, which determines the positional coordinates of the geographic vicinity.

In one embodiment of the invention, a user accesses this first mode of operation by selecting the "LOCAL INFO" key 44 on the keyboard 42, FIG. 1. Upon selection, the system 10 provides information, such as a graphical display shown in FIG. 2, at the port 16 to locate items of interest within the geographic vicinity of the user and relative to the user's current location. The scope of the geographic vicinity is generally within walking distance.

In the second mode of operation, a user is nowhere near the desired geographic vicinity but nevertheless desires information about items of interest at a destination location (for example, it is generally impractical to display all items of interest within a one hundred mile radius; rather it is more convenient to display locations of items of interest in a format that is relative to his desired destination). In one embodiment of the invention, such a user selects the "REMOTE-INFO" key 48 to access the desired set of destination position coordinates. For example, a user who is leaving Boston Logan Airport for Los Angeles International Airport (LAX) can access a port 16 at Logan and display, selectively, items of interest in an associated category relative to LAX. For example, if a user of the invention wishes to locate music stores upon arrival in Los Angeles, she can command the display of music stores relative to LAX so that they are easily located.

In order to command the display of items of interest at the destination location, and in accord with one embodiment of the invention, a user first selects "USA" at the port 16 via the keyboard 24, then the user sequentially selects "California," "Los Angeles," and finally "Los Angeles International Airport." Each of these selections are provided to the user in a menu format on the display 22, such as known to those skilled in the art.

Figure 3C:
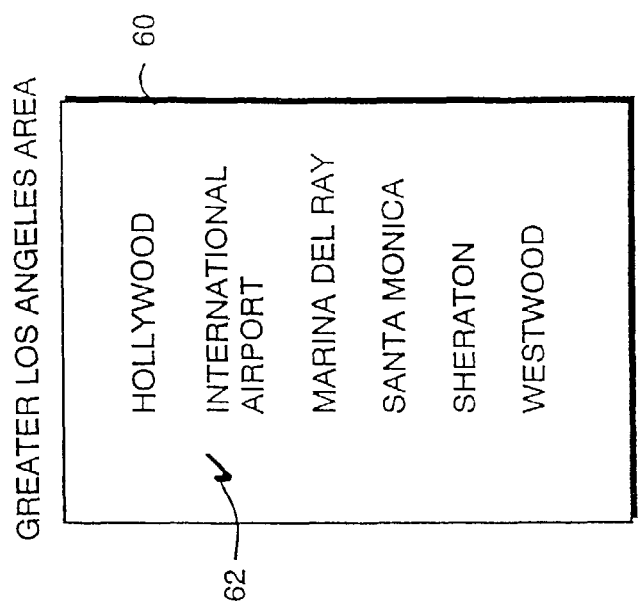
FIG. 3C shows a user interface display of various selectable locations within greater Los Angeles according to the invention and which can be displayed to a user of the system of FIG. 1.
Figure 3B:
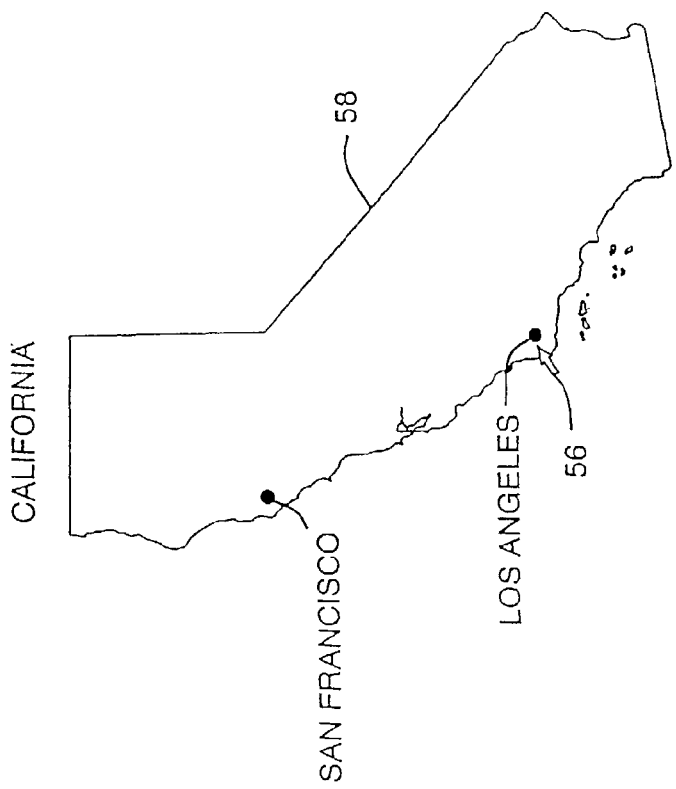
FIG. 3B shows a user interface display of a map of California providing selectable locations according to the invention and which can be displayed to a user of the system of FIG. 1.

FIGS. 3-3C schematically illustrate this display and selection process according to one embodiment of the invention. FIGS. 3-3C show successive displays which are displayed on the display 22, FIG. 1. Specifically, the system 10 of FIG. 1 first provides information to the display 22 that represents a selection 50 of various countries which can be selected by a user, such as shown in FIG. 3. In this example, a user selects the "United States" (such as shown by the check-mark 52). The system 10 thereafter provides information to the display 22 that represents a map 54 of the United States, shown in FIG. 3A, so that a user can point and select "California" with a mouse pointer 56 via the mouse tracker 25. Upon selection, an outline 58 of California is displayed, including many, if not all, of its major cities, as shown in FIG. 3B (for illustrative purposes, only Los Angeles and San Francisco are identified).

With the outline of California displayed, a user can select "Los Angeles" by again pointing the mouse pointer 56 onto the city identified as Los Angeles and clicking the mouse tracker 35. Thereafter, an alphabetic listing 60 of well-known places is provided by the system to the display 22, as shown in FIG. 3C, so that a user can, appropriately, select a geographic vicinity within which to locate the items of interest. In this example, a user would appropriately select Los Angeles International Airport, as illustrated with a check-mark 62.

As should be clear to those skilled in the art, the successive display of information within the display 22 can be accomplished in several ways, each of which is within the scope of the invention. For example, the display of information shown in FIGS. 3-3C can be done through menus only, and without the map illustrations shown in FIG. 3A and 3B. That is, a menu of information can replace the maps of FIGS. 3A and 3B, such as for example provided in FIGS. 3 and 3C. A menu of the United States, for example, at least includes a listing of the several states; and a map of California at least includes a menu listing of its major cities.

Likewise, the display of information on the display 22 can entirely be in graphical form. In such a case, the menus of FIG. 3 and 3C are replaced, respectively, with (i) graphical representations of the world, and (ii) graphical locations of key items of interest within the greater Los Angeles area.

Accordingly, the default display of information to a user monitoring the display 22 is a mixture of graphics and menus, such as shown in FIGS. 3-3C. However, a user can select only the display of graphic information by activating the "GRAPHICS" key 64, FIG. 1. Likewise, a user can also select the "MENU" key 66 to display information in the menu (text) mode. Those skilled in the art should appreciate that other keys, key names, and combinations of keys can be used in accord with the invention to select and/or display other information. For example, a print key 68 provides a command for printing the current display of the port 16, which therefore preferably includes an attached printer 70 connected via communication line 71.

Figure 4:
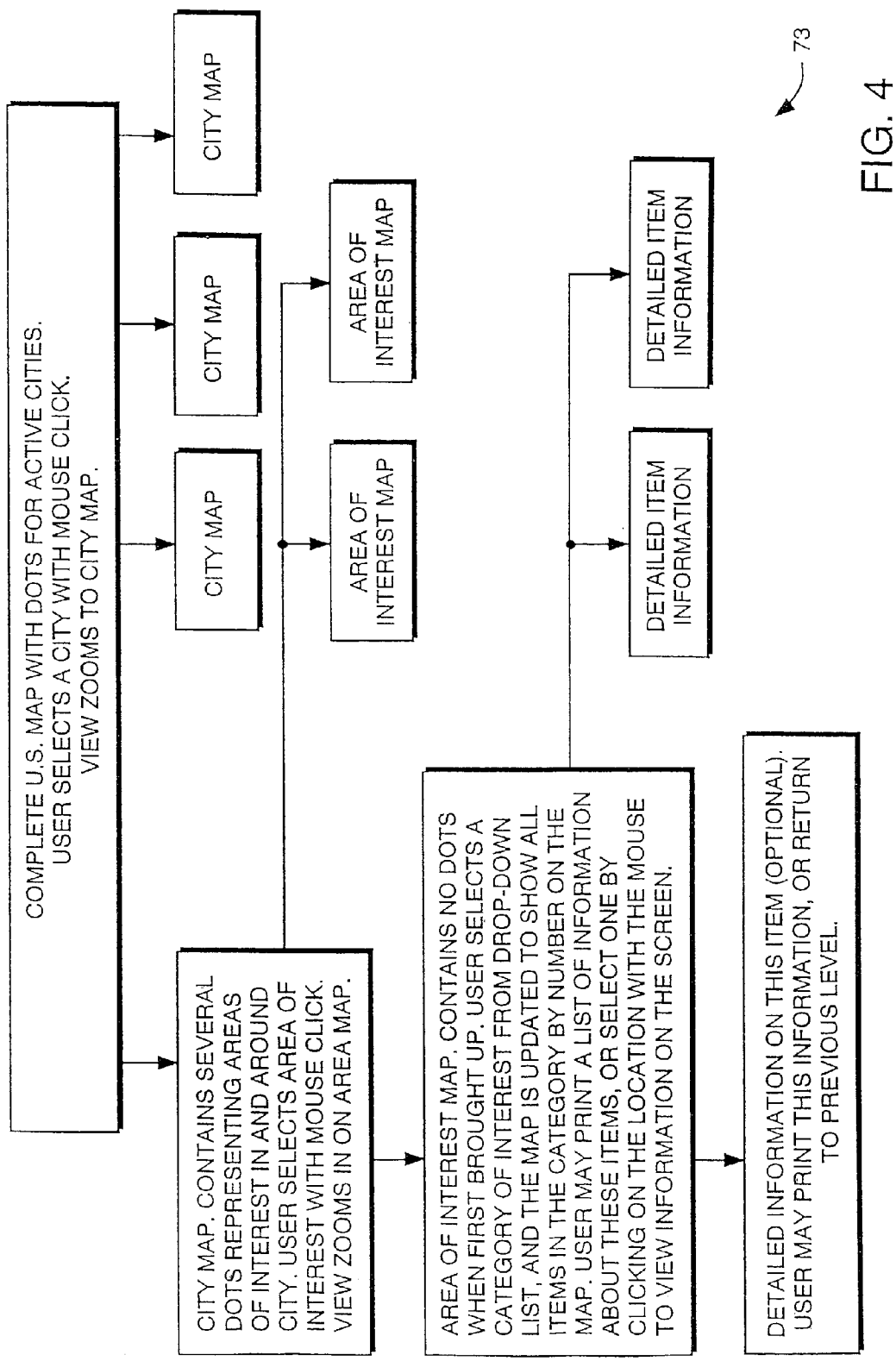
FIG. 4 illustrates a top level process flow, according to the invention, for providing information to a user at the remote port of FIG. 1.

FIG. 4 illustrates one embodiment of the invention showing a process flow 73 for providing information about selected items of interest to a user at the remote port. The flow 73 includes instructions at different levels of abstraction, such as at the U.S. level, city level, and at the specific areas of interest, which help a user to select and locate the items of interest.

Thus, it is preferred, according to the invention, that a user's selected display of items of interest within an associated category and geographic vicinity is accessed hierarchically within the database 12. As such, each set of positional coordinates corresponds to a discrete remote port location of one geographic vicinity.

Figure 4A:
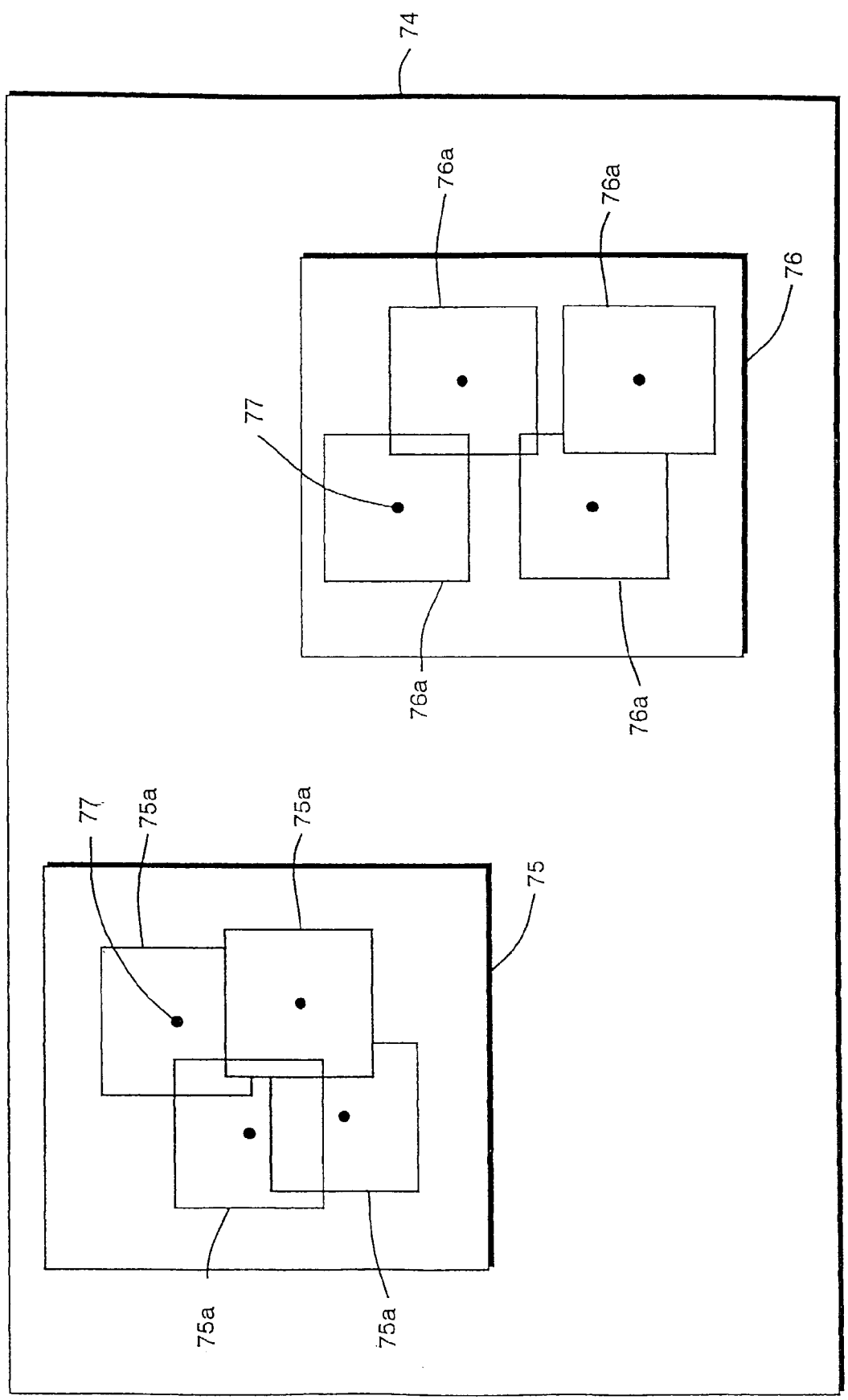
FIG. 4A shows a hierarchical structure of geographical vacinities, according to the invention.

FIGS. 4 and 4A illustrate this hierarchical approach. If, for example, a user at a remote port has commanded the display of one geographic vicinity (i.e., an area of interest map) and selects the display of a different geographic vicinity, it is necessary to first return to the associated city map, or even to the U.S. map, depending on the desired location, to access that different geographic vicinity.

FIG. 4A schematically illustrates this selection by way of a U.S. map 74 which includes two city maps 75, 76. The geographic vacinities 75*a*, 76*a* within each city map, respectively, are selectable by hierarchically selecting the appropriate city map first. In this manner, if a user is currently displaying one vicinity 74*a*, and desires a display of a vicinity 76*a*, the user must first successively select the city map 75, the U.S. map 74, and the city map 76. FIG. 4A also illustratively shows the positional coordinates 77 for each vicinity 75*a*, 76*a*.

Figure 5:
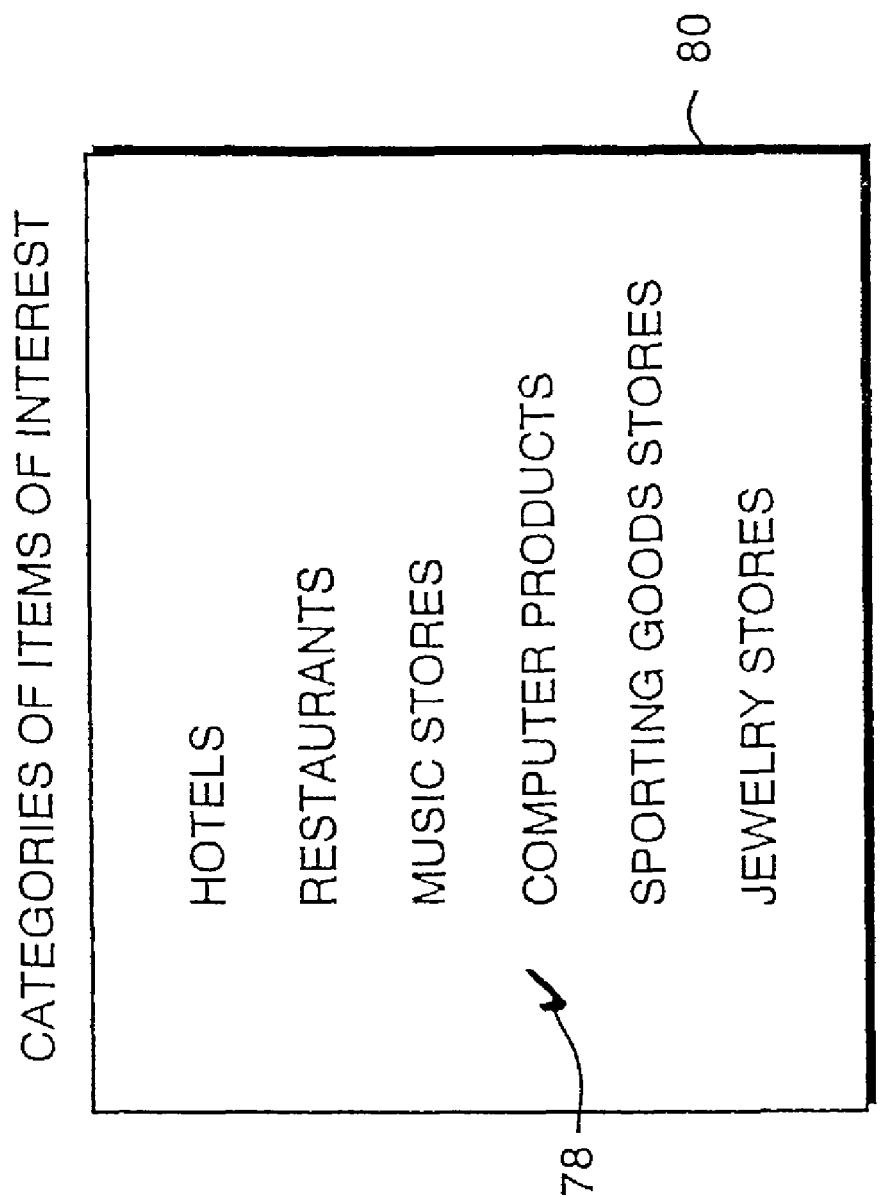
FIG. 5 shows a typical menu of categories of items of interest which are selectable by a user of the system of FIG. 1.

FIG. 5 illustrates one embodiment of the invention wherein a user selects the associated category for the items of interest from a display menu of possible items of interest. This display to select the category is preferably displayed upon activation of the remote port 16; or, alternatively, the display is commanded by a user of the system, such as by activating the "NEW SEARCH" key 76, FIG. 1. Accordingly, a user can start a new search for items of interest in a selected category by first pressing the "NEW SEARCH" key 76. Alternatively, a user can select an additional category by selecting the "ADD CATEGORY" key 46. In this manner, more than one category can be displayed at one time within the geographic vicinity.

By way of example, upon pressing the key 76, FIG. 5 illustrates one embodiment of the invention which provides a listing of possible categories of items of interest in a menu 78. A user of the system 10 can select any desired category in the menu, such as by pointing and clicking on the selected item. In this example, the user has selected "computer products," a category which was used in the illustration of FIG. 2 and which shows the selection by a check-mark 78. A user can thereafter press the "ADD CATEGORY" key 46 and select one other desired category in the menu, such as "sporting goods stores".

Alternative to the embodiment shown in FIG. 5, another embodiment of the invention provides a word association technique, known to those skilled in the art, which allows any category of items of interest to be selected by directly typing the desired search area. For example, a user of the invention could press the "NEW SEARCH" key 76 and thereafter type "computer equipment" or "computers," or other similar association, and the controller 14 of FIG. 1 would determine the best fit to the possible categories stored in the database 12 to display to the user. If the association were narrow enough, the system 10 immediately displays the items of interest within the "computer products" category, as above. However, if the search is too broad, the system can prompt the user for more information (such as known to those skilled in the art). By way of example, if a user types "computers," the system can question, or prompt, the user at the port 16 for "products," "services," or "rentals," which can thereafter be selected by the user.

The advantages of a system constructed according to the invention are several. Specifically, the invention provides a selectable display of items of interest at nearly any location, remote from the user, or centered relative to the user within the desired geographical vicinity. Further, once the display of the selected items of interest is isolated, the system provides a hard-copy for the user to walk away with. With increased usage of the invention, a corresponding increase in the number of remote access ports provides flexibility for users who can, thereby, access the system from widely accessible commercial locations, e.g., airports, car rental agencies, and train stations. In addition, the remote access port of the invention can be located at a user's home, providing even greater flexibility for those persons who regularly travel (or who regularly need information about items of interest at a selected geographic vicinity). A person's home computer system provides data processing capability which, with a modem and software configured to communicate with the database, can provide many, if not all, of the features of the remote access port 16 described above. As such, the remote access port of the invention can include personal computers, subnotebooks, notebooks, Apple's Newton product, facsimiles, phones, cellular, mainframes, minis, interactive television and/or hybrid products.

Figure 6A:
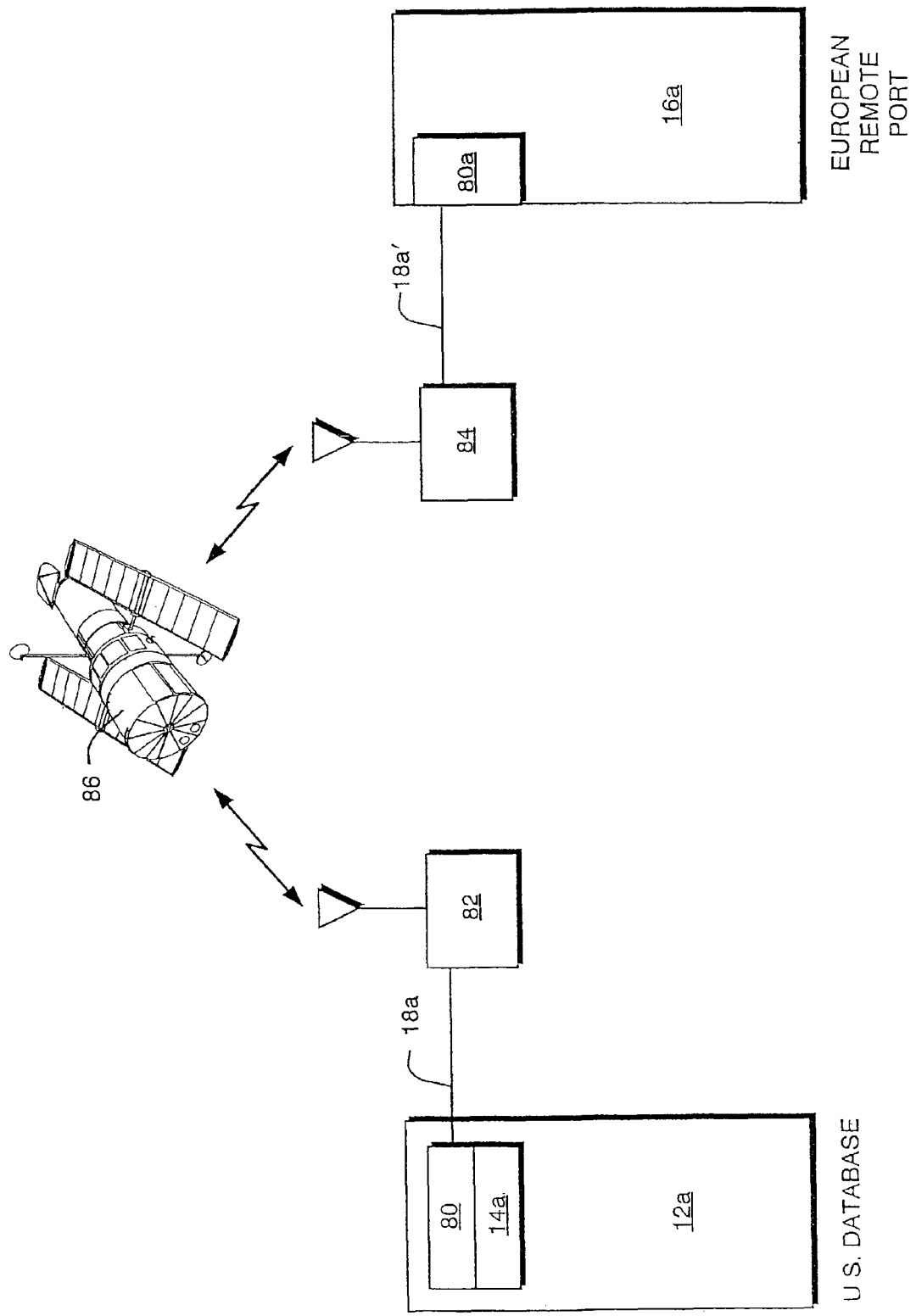

FIG. 6A illustrates a system, including a telephone-modem-satellite communications link, constructed according to the invention. Specifically, FIG. 6A shows a database 12*a* and controller 14*a*, which are illustratively located in the United States and which are similar to the database 12 and controller 14 of FIG. 1. The database and controller 12*a*, 14*a* connect and communicate with a remote port 16*a*, which is illustratively located in Europe and which is similar to the port 16 of FIG. 1. A modem 80 couples to the controller 14*a*, such as known to those skilled in the art, and further to a telephone line 18*a*. The telephone line 18*a* connects through the telephone network to the telephone relay center 82 which provides communications, such as overseas communications, to a remote relay center 84 via a satellite 86. The relay center 84 connects to the remote port 16*a* (including an internal modem 80*a*) by the land-based telephone line 18*a'* so that, in combination, a user of the remote port 16*a* can access information from the database such as described above.

It should be apparent to those skilled in the art, for example, that the lines 18*a* and 18*a'* can also be constructed with fiber-optic cabling, co-axial cabling, internet communications and the like.

FIG. 6B illustrates other embodiments of the invention for communicating between (i) the database 12*b* and controller 14*b* and (ii) the remote port 16*b*. A cellular communicator 88 connects to the controller 14*b* and communicates, via an antennae 90, with the established cellular communications network 92. The communications link is completed with the remote port 16*b*, including its own antenna 94 and cellular communicator 88*b*, so that a user of the port 16*b* can communicate, as above, with the database 12*b*.

It should again be apparent to those skilled in the art that the communications methods described and illustrated herein can be modified, in accord with the invention, to form other communication links. For example, portions of the communications link of FIG. 6A can be mixed with portions of the link of FIG. 6B to establish a working and acceptable link according to the invention.

Further, the communications link of FIG. 6B can be replaced with other communications mechanisms known to those in the art. For example, the antennas 90, 94 and communicators 88, 88*b* can be replaced by radiowave or microwave devices which communicate via a compatible network instead of a cellular network 92.

FIG. 7A illustrates one embodiment of the invention wherein a display 22*c*, such as the display 22 of FIG. 1, includes—or is replaced by—a hard-copy printer 100, such as a computer printer or facsimile. In such an embodiment, a user at the port 16*c* receives a hard-copy 102 of the interactive communications between the port 16*c* and the database 12, FIG. 1. As above, the user commands selective display of data via the keyboard 24*c* and/or mouse tracker 25*c*, and a display of the geographic vicinity with the selected items of interest in the selected category are provided via the printer 100.

It should be apparent to those skilled in the art that one acceptable remote port, according to the invention, includes a port comprising a printer 100 and a telephone (not shown). In such an embodiment, a user accesses the database by telephoning the database and requesting a display of items of interest in the selected category and geographic vicinity. The controller 14 of FIG. 1 can include voice recognition software and hardware, known to those skilled in the art, which prompts the user for requests and identifies and responds to the user's verbal replies. After identifying the user's desired category and present location (or intended destination location), the database transmits information in a form recognizable by the printer 100 so that the geographic vicinity and items of interest are displayed to the user at the telephone/printer remote port.

Alternatively, a user can fax selections for the category and geographic vicinity of interest as a hard-copy. A system administrator at the database can interpret the user's selection sheet and command the transmission of the requested information, including the items of interest, back to the user. Alternatively, the database can interpret the user's selections on the sheet to automatically respond and transmit the appropriate display of information, including the items of interest, to the user.

FIG. 7B shows another remote port 16d which includes a voice generation system 110 and speaker 112. In such an embodiment, a user at the port 16*d* (i) listens to questions, or reads messages on the display 22*d*, as prompted by the database, and (ii) answers the questions by the keyboard 24*d*. After the system identifies the user's desired geographic location and category, a print-out or display of the information is made available to the user, such as described above.

Figure 8:
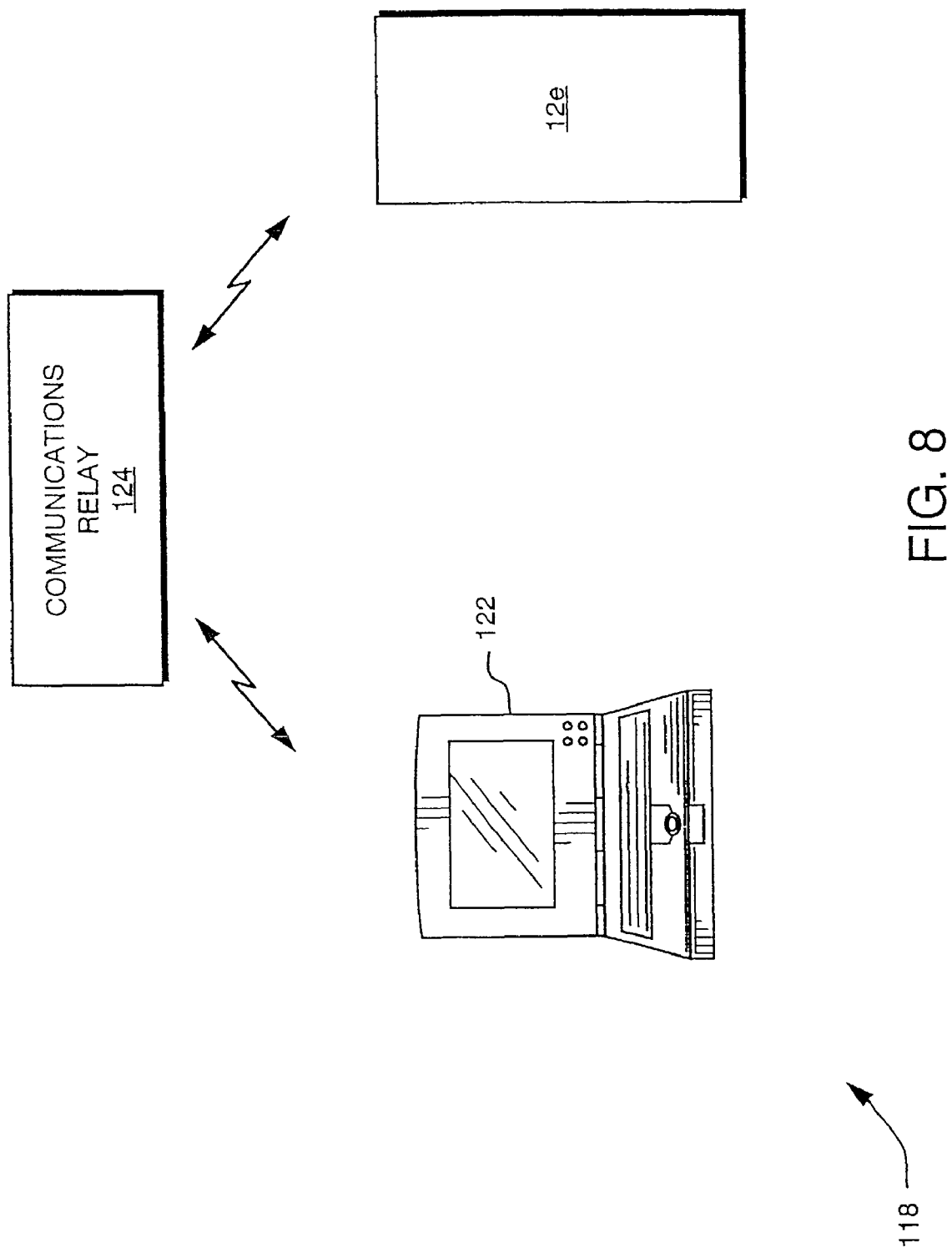
FIG. 8 illustrates a system constructed according to the invention and which includes a mobile remote port for accessing the locations of the selected items of interest.

FIG. 8 illustrates a mobile remote system 118 constructed according to the invention. A user holds one of several handheld devices 122 which provide both display capability and transmit/receive capability to a remote relay 124, e.g., a cellular or radiowave communication relay. The device 122 thus operates as the remote port 16 of FIG. 1. The device 122 can additionally include a GPS receiver to accurately determine the user's positional coordinates in real-time, or a PCM CIA Type II or Type III modem interface which can be miniaturized to credit card size. Alternatively, the user can specify his position coordinates and transmit that information to the database 12e. In this illustrated embodiment, the system 118 continually redefines the geo-definition of the geographic vicinity based upon the positional coordinates of the user. Data is assembled and maintained using the positional coordinates to generate a map of the geographic vicinity relative to the user and including the locations of the items of interest. As above, this geographic vicinity is assumed to be within a walking distance of the user; however, the user can select a greater radius for display, or another destination location, as needed.

The invention generally incorporates software to facilitate the several embodiments described herein and to support the principles of the invention. As known to those in the art, the data within the database can be maintained, for example, on a SQL-server, or in xBASE. The software is preferably portable to other operating systems, such as to Apple, Apple/IBM, Unix, DEC, OS/2, DOS, Windows 3.1, Windows '95; and preferably allows scalability to 64-bit architectures and greater, as technology advances.

In accord with the invention, software code supporting the database interaction with the remote port can include object-oriented programming, Visual Basic, and other software architectures configured to allow user interaction, portability to other platforms, interface with the internet or other gateways, and relational management.

FIG. 9 illustrates one embodiment of database architecture 130 which is suitable for use as the database 12 of FIG. 1. Specifically, the architecture 130 includes separate phone and fax interfaces, 131, 132, respectively, to interface with any one of the remote ports, e.g., the port 16 of FIG. 1. FIG. 10 illustrates system architecture including database architecture 140 and remote port architecture 141 connected via a pair of phone lines 142, 143 to, respectively, a touch-tone phone 142a and fax machine 143a. In this manner, a user 144 can make requests and listen to responses on the phone 142a, and receive maps and instructions via the fax machine 143a.

Other modules within the database architectures 130 and/or 140 include the following:

Communications managers 133, 133' (FIGS. 9 and 10, respectively) handle all data transfers for a single internal modem (or telephone interface controller) 131 in the host database, e.g., a personal computer. It responds to remote requests for data by passing the requests to a session manager 138, and handles all modem control issues, such as answering incoming calls. The communications manager 133' of FIG. 10 is configured to service users who access the database from a remote port comprising a dial-up telephone 142a. As such, the manager 133' translates touchtone inputs into data and fax transmission requests to be sent to the session manager 138, and monitors the line 142 for time-outs when a user 144 forgets to actively disconnect. The manager 133' can also translate data from the session manager 138 into synthesized voice output for presentation to an end user 144.

The fax manager 134 handles all requests from the session manager 138 to fax and receive documents to and from end users connected through a communications link.

Because there generally are a plurality of remote ports arranged for access to the system database, there are preferably a plurality of communications managers 133 and modems 131 to service requests from the remote ports. Likewise, although the database generally includes one fax manager 134 and one interface 132, a plurality of fax managers 134 and fax machine interfaces 132 can be incorporated therein. Accordingly, the host database can answer and service a variety of remote ports simultaneously.

The session manager 138 tracks and controls information for each active session being hosted by the database architecture. It responds to requests for data passed to it by each communications manager 133 operating in the database architecture, and prioritizes, queues, and forwards these data requests to the end user data server 136. The manager 138 also forwards data requests to the system data server 137 (FIG. 9 only) to log certain system information, such as user connection times, errors, system utilization, and other administrative functions.

In FIGS. 9 and 10, database storage memory 139 stores information which is accessible by the end user data server 136 and which is responsive to user requests, including the selected city, locations of items of interest, maps of geographic vacinities, and advertising information. In FIG. 10, an additional database storage memory 139a stores information which is accessible by the system data server 137 and which stores information such as system usage and transaction logging.

The end user data server 136 responds to requests from the session manager 138 by providing data that has been requested for transmission to the remote port. This data includes that information required to place items of interest on the selected geographic vicinity. Preferably, the end user data server 136 is the only mode of access to the specific map data, and thus all requests for this data are made through this server.

In FIG. 9, the system data server 137 interacts with the session manager 138 to record system administrative data. The server 137 responds to requests from the session manager 138 to provide or record information used to track system usage, system response times, user preferences, and other data items that are used to optimize the different modules within the architecture 130.

The flow and control of information by the information controller 14, FIG. 1, can include several of the functions shown illustratively in FIG. 11. Specifically, a display manager 150 controls the drawing of maps (i.e., geographic vacinities) on the screen 22 and further controls status messages to a user of the system. The manager 150 responds to requests for screen updates and status message display from a system kernel module 159, described in more detail below. It also sends requests to a map manager 151 when rendering maps to the display, and sends requests to a data manager 152 in order to obtain system information required to update the display 22 or to present status messages to the user.

A map manager 151 manages map data and provides data for drawing maps to the display manager 150. The manager 151 responds to requests from the display manager 150 by providing information appropriate to the current context of the session, such as the graphical image (e.g., the geographic vicinity and advertising information) that needs to be displayed, the locations on the screen 22 of the items of interest, and the location and content of the titles of the items of interest.

A data manager 152 handles all data requests from the system kernel module 159, map manager 151, and print manager 153, and further interfaces to external data sources 155, 156 (these databases 155, 156 store raw data as the database information). The manager 152 determines the need for remote data access via a communications manager 157, and passes on remote data requests to the manager 157. The manager 152 also provides all data access services to other managers and modules within the controller 14. For example, if the data is not stored locally, the data manager 152 sends a request to the communications manager 157 to provide the desired data.

A print manager 153 handles and controls printing activities in the system, such as to a connected printer 154 (similar to the printer 110, FIG. 7C; or such as a printer connected directly to the database 12). By way of example, the manager 153 requests map and other data from the data manager 152 to create and print outputs requested by the system kernel module 159. Specifically, the manger 153 responds to requests from the system kernel module 159 for print services, and sends requests to the data manager 152 based upon the system kernel requests. The manager 153 uses the information supplied by the data manager 152 to create formatted output for printing, such as by utilizing a standard Windows™ print driver interface to print the requested output.

The communications manager 157 handles all remote communications requirements, including remote data requests, and further accepts and transfers raw data from a remote data source 158 (such as data downloads to modify or add to data within the database). The manager 157 responds to requests from the system kernel module 159 for initialization, connection, and shutdown of remote connections appropriate with the actual hardware in use. It also responds to remote data requests from the data manager 152 by sending the request for remote data to the remote data source 158. When the remote data source 158 responds to the request, the communications manager 157 passes that response on to the data manager 152.

The system kernel module 159 traps all user inputs and determines required actions in the system, including those actions responsive to a user's inputs 160 (such as described above in connection with the keyboard 24). Specifically, the module 159 responds to mouse movements, mouse button clicking, and typing. Depending on the user's input, the module 159 will send requests for services to (i) the display manager 150 to update the display, (ii) the data manager 152 to provide information concerning the map and/or other system needs, (iii) the print manager for printing services, and (iv) the communications manager 157 for remote communications services.

FIG. 12 illustrates one preferred embodiment of the invention wherein certain advertising information is included within, or attached to, the geographic vicinity which is displayed or printed to a user at a remote port. For example, FIG. 12 shows one illustrative geographic vicinity 30' which was shown previously in FIG. 2, except that an advertisement 180 is displayed as part of that vicinity (the advertisement 180 is generically shown with the text "ADVERTISEMENT," when, in fact, a paying customer's name or company is usually displayed at that location). In the normal use of the invention, the advertiser who pays for the advertisement is generally associated with the items of interest being displayed. For example, a credit card bank or sporting goods manufacturer typically specify (and pay for) the "advertisement" logo or wording.

It should be apparent to those skilled in the art that any of the items of interest within a displayed geographic vicinity can be selected by a user and that the database can thereafter supply additional detail about that selected item of interest. In such an embodiment of the invention, the database is configured to store such additional detail and also to transmit this information to the remote port when selected. The remote port, in turn, displays the information for the user. By way of example, if the selected category is "restaurants" and a user selects a particular restaurant (i.e., one of the items of interest), a display of additional detail can, for example, include a digital picture of the layout of the dining room or bar. Additionally, the entertainment scheduled for that evening can be displayed while a recording of any associated music is played at the remote port's speakers.

Thus, a further embodiment of the invention includes a digitized, multi-media presentation that is transmitted to the remote port when an associated item of interest is selected. Using a camrecorder and/or other video capture, storage, and editing analogue or digital devices, for example, a short video clip is embedded in the data associated with the information about the items of interest and transmitted and displayed when selected.

In order to utilize the above-described multi-media presentation, the system of the invention must provide sufficient bandwidth, processing speed, and display resolution, and the remote port must display the multi-media transmissions with sufficient speed and resolution so as to be convenient to the user of that information. Typically, the minimum central processing unit of the database and remote port run at least at 16 MHZ and is based on a CISC (complex instruction set) architecture. Further, the database, remote port and communications link should be able to transmit data at an uncompressed speed of 9600 baud per second; preferably, these devices should be faster, e.g., 28.8 Kbps, utilizing modems that subscribe to emerging industry standards such as V.34. Additionally, special connections may be required at the server, including what are known to those skilled in the art as SLIP, PPP, and TC/ICP protocols. In some cases, where additional bandwidth may be required, the modem is replaced with special interfaces provided by regional telecommunications systems that also provide dedicated optic fiber cabling. Some of those linkages are known as T1, ISDN, and 56 Kbps wide bandwidth connections. In addition, bandwidth may be enhanced by microwave and other communication links that do not require direct cabled connections.

Appendix A contains, for disclosure purposes, subject matter setting forth non-limiting source code which is suitable for application with the invention. Appendix A is herein incorporated by reference.

The invention thus attains the objects set forth above, in addition to those apparent from the preceding description. Since certain changes may be made in the apparatus and methods described herein without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

The invention claimed is:

1. A method for advertising over the Internet, comprising:
   at a database, receiving at least in part through the Internet, a request from one of a plurality of ports remotely located from the database, the request containing (a) at least one user-selected category and (b) a user-selected geographic vicinity;
   determining, at the database, a response to the request, the response defining locations of a plurality of items of interest within the user-selected geographic vicinity and based upon the at least one user-selected category;
   determining, at the database, a plurality of advertisements in response to the request the plurality of advertisements being included within the response; and from the database, transmitting, at least in part through the Internet, the response to the port for graphical display at the port wherein at least part of the graphical display is selectable by the user.

2. The method of claim 1, wherein the response includes one or more digital pictures about at least one of the plurality of items of interest.

3. The method of claim 1, wherein the response includes one or more videos about at least one of the plurality of items of interest.

4. The method of claim 3, wherein each of the videos is a video clip.

5. The method of claim 1, the graphical display comprising a map illustrating positions of one or more of the plurality of items of interest.

6. The method of claim 1, further comprising responding, at the port, to at least one mouse click selecting the at least one category and the geographic vicinity to formulate the request.

7. The method of claim 1, the step of determining the response further comprising determining multimedia information about at least one of the plurality of items of interest.

8. The method of claim 1, further comprising utilizing one or both of a keyboard and mouse tracker at the port to form the request.

9. The method of claim 1, at least one of the plurality of advertisements being tagged to one or more of the plurality of items of interest.

10. The method of claim 1, wherein at least one of the plurality of advertisements is included within, or attached to, the displayed geographic vicinity at the port.

11. The method of claim 1, at least one of the plurality of advertisements being provided by an advertiser connected with the user-selected category.

12. The method of claim 1, further comprising attaching the plurality of advertisements to the response in association with the plurality of items of interest.

13. The method of claim 1, further comprising:
at the database, receiving, over the Internet from the port and in response to user selection of at least one of the plurality of items of interest, an additional request for additional information related to the selected item of interest;
determining the additional information from the database in response to the additional request; and
sending the additional information, via the Internet, to the port for graphical display at the port.

14. The method of claim 13, the additional information comprising multimedia information about the selected item of interest.

15. The method of claim 13, the additional information comprising a video clip about the selected item of interest.

16. The method of claim 15, wherein the video clip is embedded in data associated with the identified one of the plurality of items of interest, and is transmitted and displayed when selected.

17. The method of claim 13, further comprising utilizing one or both of a keyboard and mouse tracker at the port to form the additional request.

18. The method of claim 1, wherein a remote communication protocol is used to communicate over the Internet.

19. The method of claim 1, wherein the database is a client-server.

20. The method of claim 19, the port comprising one of a personal computer, a notebook, a subnotebook and a handheld device configured to communicate with the database.

21. The method of claim 1, wherein at least one of the plurality of advertisements provides advertising information about at least one of the plurality of items of interest.

22. The method of claim 1, further comprising generating, at the database, a display at each of the plurality of ports to allow a user to select, through use of a mouse tracker and/or keyboard at the port, one or more categories and a geographic vicinity.

23. The method of claim 1, the steps of receiving, determining a response, determining the plurality of advertisements, and transmitting being performed concurrently for each request received concurrently from two or more of the plurality of ports.

24. The method of claim 1, wherein the graphical display displays the plurality of items of interest together with the advertisements.

25. The method of claim 1, further comprising a step of managing the data to interface the database with a remote data request or an external data source, and to control the display of data at the port.

* * * * *